(12) United States Patent
Ishii et al.

(10) Patent No.: US 10,818,405 B2
(45) Date of Patent: Oct. 27, 2020

(54) METAL FINE PARTICLE-CONTAINING COMPOSITION

(71) Applicant: Furukawa Electric Co., Ltd, Tokyo (JP)

(72) Inventors: Tomohiro Ishii, Tokyo (JP); Hidemichi Fujiwara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 275 days.

(21) Appl. No.: 15/743,125

(22) PCT Filed: Jul. 8, 2016

(86) PCT No.: PCT/JP2016/070247
§ 371 (c)(1),
(2) Date: Jan. 10, 2018

(87) PCT Pub. No.: WO2017/007011
PCT Pub. Date: Jan. 12, 2017

(65) Prior Publication Data
US 2019/0019594 A1 Jan. 17, 2019

(30) Foreign Application Priority Data

Jul. 9, 2015 (JP) .................................. 2015-137884

(51) Int. Cl.
*H01B 1/22* (2006.01)
*B22F 1/02* (2006.01)
(Continued)

(52) U.S. Cl.
CPC ............. *H01B 1/22* (2013.01); *B22F 1/0014* (2013.01); *B22F 1/0018* (2013.01);
(Continued)

(58) Field of Classification Search
CPC .... B23K 35/00; B23K 2103/08; B23K 35/26; B22F 2998/10; B22F 2999/00
(Continued)

(56) References Cited

U.S. PATENT DOCUMENTS

2006/0151580 A1* 7/2006 Flint .................. B23K 35/0244
228/244
2007/0245852 A1* 10/2007 Takaoka ............. B23K 35/0244
75/255
(Continued)

FOREIGN PATENT DOCUMENTS

| CN | 101351296 A | 1/2009 |
| CN | 101745636 A | 6/2010 |

(Continued)

OTHER PUBLICATIONS

Michael Tuttle Musser, Ullman's Encyclopedia of Industrial Chemistry: Adipic Acid, p. 1 (2000).*
(Continued)

*Primary Examiner* — Coris Fung
*Assistant Examiner* — Danielle M. Carda
(74) *Attorney, Agent, or Firm* — DLA Piper LLP (US)

(57) ABSTRACT

A particle composition includes metal fine particles composed of a metal element having a bulk melting point of greater than 420° C. with a primary particle diameter of primary particles of the metal fine particles being 1 nm to 500 nm, a part of or an entire surface of the metal fine particles being coated with a coating material; a low melting point metal powder composed of a metal or alloy having a bulk melting point of 420° C. or less; and an activating agent that decomposes and removes the coating material from the surface of the metal fine particles after the low melting point metal powder is melted, wherein a content of the metal fine particles containing the coating material is 0.5 mass % to 50
(Continued)

COPPER-TIN ALLOY PHASE     TIN-RICH PHASE

VOID     10 μm mass %, and a ratio ([inorganic compound/metal fine particles]×100 (mass %)) of the inorganic compound in the metal fine particles is 0.1 mass % to 50 mass %.

17 Claims, 2 Drawing Sheets

(51) Int. Cl.
| C22C 13/00 | (2006.01) |
| C22C 18/00 | (2006.01) |
| H01B 1/00 | (2006.01) |
| C22C 12/00 | (2006.01) |
| B23K 35/26 | (2006.01) |
| B23K 35/02 | (2006.01) |
| H01B 1/16 | (2006.01) |
| C22C 13/02 | (2006.01) |
| C22C 9/06 | (2006.01) |
| H01B 1/02 | (2006.01) |
| C22C 9/00 | (2006.01) |
| B23K 35/30 | (2006.01) |
| B22F 1/00 | (2006.01) |
| B23K 35/28 | (2006.01) |

(52) U.S. Cl.
CPC .............. *B22F 1/0062* (2013.01); *B22F 1/02* (2013.01); *B23K 35/025* (2013.01); *B23K 35/0244* (2013.01); *B23K 35/262* (2013.01); *B23K 35/302* (2013.01); *C22C 9/00* (2013.01); *C22C 9/06* (2013.01); *C22C 12/00* (2013.01); *C22C 13/00* (2013.01); *C22C 13/02* (2013.01); *C22C 18/00* (2013.01); *H01B 1/00* (2013.01); *H01B 1/02* (2013.01); *H01B 1/16* (2013.01); *B23K 35/28* (2013.01)

(58) Field of Classification Search
USPC .......................................................... 75/225
See application file for complete search history.

(56) References Cited

U.S. PATENT DOCUMENTS

| 2009/0301607 A1 | 12/2009 | Nakano et al. |
| 2010/0221559 A1 | 9/2010 | Konno |
| 2010/0270515 A1 | 10/2010 | Yasuda et al. |
| 2012/0103515 A1 | 5/2012 | Endoh et al. |

FOREIGN PATENT DOCUMENTS

| CN | 101809107 A | 8/2010 |
| CN | 101875158 A | 11/2010 |
| CN | 102470490 A | 5/2012 |
| JP | 08-057681 A | 3/1996 |
| JP | 08-164494 A | 6/1996 |
| JP | 2001-225180 A | 8/2001 |
| JP | 2002-126869 A | 5/2002 |
| JP | 2004-107728 A | 4/2004 |
| JP | 2007-260776 A | 10/2007 |
| JP | 2009-006337 A | 1/2009 |
| JP | 2010-050189 A | 3/2010 |
| JP | 2013-154353 A | 8/2013 |
| JP | 2013-212524 A | 10/2013 |
| WO | 2014/168027 A1 | 10/2014 |

OTHER PUBLICATIONS

Ning-Cheng Lee, Reflow Soldering Processes and Troubleshooting, pp. 37-55 (2001).*
Office Action dated Jul. 25, 2019, of counterpart Chinese Application No. 201680040603.1.
Office Action dated Mar. 5, 2020, of counterpart Chinese Application No. 201680040603.1, along with an English translation.

* cited by examiner

METAL FINE PARTICLE-CONTAINING COMPOSITION

TECHNICAL FIELD

This disclosure relates to a metal fine particle-containing composition usable for joining metals of electronic parts, for example. Specifically, this disclosure relates to a metal fine particle-containing composition containing a plurality of types of metal particles and allowing joining between metals of electronic parts, for example, by heating.

BACKGROUND

Brazing or soldering has been known as a means to physically and electrically join electronic parts to each other conventionally. For brazing or soldering, a filler material (braze or solder) having a melting point lower than that of the base materials to be joined together is melted and used as a type of an adhesive. This allows the brazing or soldering to join a plurality of parts without melting the base materials. It is recognized that atoms having affinities in the braze or solder are easily accessible to atoms on the surface of the base materials to be joined as well as diffusion phenomenon in which elements in the molten braze or molten solder enter the base materials occurs.

Brazing and soldering are distinguished for convenience by the melting point of the filler material to be used. Specifically, the treatment in which the liquidus temperature is greater than or equal to 450° C. is referred to as brazing, and the filler material used in the brazing is referred to as braze. Further, the treatment in which the liquidus temperature is less than 450° C. is referred to as soldering, and the filler material used in the soldering is referred to as solder. Classification based on the liquidus temperature 450° C. is currently used unifiedly in the terms of the Japanese Industrial Standard (JIS) as well.

For soldering, Sn—Pb eutectic alloy has been widely used as the solder material. The Sn—Pb eutectic alloy has low melting temperature and excellent diffusibility under high temperature conditions during joining. However, when the Sn—Pb eutectic alloy is melted as solder, transpiration or scattering of lead and lead oxide contained in the Sn—Pb eutectic alloy inevitably occurs. For this reason, the development of solder free of the lead component has been advanced. Further, in soldering, flux components are compounded in solder for the purpose of removing an oxide film contained in the base materials, and promoting the wetting phenomenon of the solder, for example. However, the flux components also have a problem that a step of washing is needed after the soldering operation.

In contrast, in the brazing, copper braze, gold braze, palladium braze, and silver braze are known as typical examples of braze, for example. The brazing temperature is as high as about 1090° C., 1040° C., 900° C., and 750° C. in this order for the examples above. Phosphorous copper brazing paste may be used to join copper pipes, and in this case, high temperature heating of about 600° C. or more is needed as well. This needs a high skill of the operator, and is a process that is difficult to automate. The braze material is used in shapes such as wires, bands, particles or powder.

Japanese Unexamined Patent Application Publication No. 2001-225180 (JP 2001-225180 A) discloses a method of joining metals aiming at joining two metal bodies through a fusion layer of metal ultrafine particles. In JP 2001-225180 A, a layer formed by metal ultrafine particles having a particle diameter of 1 nm to 100 nm coated with an organic substance is disposed between joined surfaces of the metal bodies, and the layer is heated at a temperature of 150° C. to 500° C. This produces a fusion layer of metal ultrafine particles from the layer of the metal ultrafine particles to fuse and join the metal ultrafine particles and the joined surfaces of the two metal bodies so that the two metal bodies are joined to each other through the fusion layer of the metal ultrafine particles.

Japanese Unexamined Patent Application Publication No. 2002-126869 (JP 2002-126869 A) discloses a method of brazing and joining between bulk metals utilizing a lead-free solder material. JP 2002-126869 A uses a braze material and metal colloidal dispersion liquid in which ultrafine metal particles having an average particle diameter of 1 nm to 100 nm and having a surface coated with an amine compound are uniformly dispersed in an organic solvent. The metal colloidal dispersion liquid is applied to and fills the gap between the opposing surfaces of the bulk metals to be joined and is heated so that mutual diffusion fusion at the contact interface between each of the bulk metal surfaces to be joined and the ultrafine particles, and fusion joining between the ultrafine particles filled in the gap are performed to produce a joining layer.

Japanese Unexamined Patent Application Publication No. 2009-6337 (JP 2009-6337 A) discloses a technique providing an ink solder composition equivalent to an Sn—Ag based alloy solder. JP 2009-6337 A discloses an ink solder composition including nano-sized tin nanoparticles, silver nanoparticles, and flux components where the tin nanoparticles and the silver nanoparticles are evenly dispersed in a nonpolar solvent having a high boiling point to produce the ink solder composition. In the composition, the mixing ratio of the tin nanoparticles and the silver nanoparticles is 95:5:4.5 to 99.5:0.5. Further, the ratio $d_1:d_2$ of the average particle diameter $d_1$ of the tin nanoparticles and the average particle diameter $d_2$ of the silver nanoparticles is 4:1 to 10:1. Moreover, the composition corresponds to an ink solder composition in which the addition amount of the flux component per 10 parts by mass of tin nanoparticles is 0.5 parts by mass to 2 parts by mass, and a hydrocarbon solvent having a boiling point of 200° C. to 320° C. is selected.

Japanese Unexamined Patent Application Publication No. 8-057681 (JP 8-057681 A) discloses a low melting point brazing material aimed at providing a low melting point brazing material having sufficient brazing strength. JP 8-057681 A discloses that one or more types of metal powder selected from Au, Ag, Cu, Ni, Pt, and Pd as a noble metal with an excellent workability and one or more species of metal powder selected from Sn, Pb, Cd, In, and Zn as a low melting point metal with an excellent workability are mixed, and then compacted and solidified into a required shape.

Japanese Unexamined Patent Application Publication No. 2004-107728 (JP 2004-107728 A) discloses a joining material in place of lead-free high temperature solder where the joining material employs composite metal nanoparticles as a main agent for joining and the nanoparticles are produced by bonding and coating the core made of metal particles having an average particle diameter of about 100 nm with an organic substance containing C, H, and/or O as main components.

Japanese Unexamined Patent Application Publication No. 2010-50189 (JP 2010-50189 A) discloses a semiconductor device aimed at providing a joining material with a high joining strength and fracture toughness, which joining material is free from a lead component, and the semiconductor device that includes the joining material as a joining layer.

JP 2010-50189 A is directed to a composite metal sintered body with the joining layer in which a metal X having hardness greater than that of Ag has a dispersed phase in an Ag matrix composed of crystal grains of 10 nm to 1000 nm. In the composite metal sintered body, the interface between the Ag matrix and the metal X dispersed phase is metal joined, the interface between the outermost surface of the electronic member and the Ag matrix are metal joined, and the interface between the outermost surface of the electronic member and the metal X dispersed phase is metal joined. Each metal X dispersed phase is a single crystal body or a polycrystalline body, and in the metal X dispersed phase of the polycrystalline body, the internal grain boundaries thereof are metal joined without interposing the oxide film layer.

Japanese Unexamined Patent Application Publication No. 8-164494 (JP 8-164494 A) discloses a silver braze paste including a fine powder of a silver braze containing at least silver and copper, an antioxidant, and a solvent, as a braze paste that limits oxidation.

The disclosures disclosed in JP 2001-225180 A and JP 2002-126869 A, and JP 2004-107728 A are directed to a joining method based only on sintering of metal fine particles caused by characteristics of melting point depression of metal ultrafine particles. This causes a problem in that it is hard to obtain a dense joined body with less voids.

In the disclosure disclosed in JP 2009-6337 A, a practical limitation is caused in that a nanometer-sized tin particles having a particle diameter of 100 nm or less and a hydrocarbon-based nonpolar solvent having a high boiling point are used in combination. In addition, since the metal composition of the joining layer needs to be included in the composition of the conventional Sn—Ag based solder, the heat resistance is insufficient.

In the disclosure disclosed in JP 8-057681 A, the metal powder is compacted and solidified at a high temperature, and then shaped by extrusion processing and rolling processing, for example. This not only complicates the process, but also greatly limits the use conditions such as the shape of the materials to be joined.

In JP 2010-50189 A, not only the crystal grain size of the joining layer is restricted, but also silver is indispensable as a matrix phase. For this reason, depending on the specification of the materials to be joined, a problem of silver migration may occur.

In JP 8-164494 A, joining at a low temperature is not expected in consideration of the metal composition constituting the paste and particle size. In addition, the oxidation of copper may remarkably reduce the performance.

It could therefore be helpful to provide a metal fine particle-containing composition that joins metals such as electronic parts at a relatively low temperature, achieving high strength joining and a less amount of remaining organic substances after joining.

SUMMARY

We found that when a metal fine particle-containing composition for joining is used, including metal fine particles in which at least a part of the surface thereof is coated with a coating material and the particles are composed of a metal element having a nano-size particle diameter and a relatively high melting point; metal powder having a relatively low melting point; and an activating agent that decomposes and removes the coating material on the surface of the metal fine particles by heating at the time of joining, the temperature of the metal powder is increased at the time of joining to cause the metal powder to melt, and then the activating agent removes the coating material on the surface of the metal fine particles so that at least a part of or most of the metal fine particles melts to produce an alloy with the low melting point metal. This achieves a joined body that has an increased melting point after joining, excels in heat resistance and electrical conductivity, and has improved joining strength.

We thus provide:

(1) A metal fine particle-containing composition includes: metal fine particles (P1) composed of a metal element (M) having a bulk melting point of greater than 420° C. with a primary particle diameter of primary particles of the metal fine particles being 1 to 500 nm, and a part of or an entire surface of the metal fine particles being coated with a coating material (C) that limits sintering between the metal particles; a low melting point metal powder (P2) composed of a metal or an alloy having a bulk melting point of 420° C. or less; and an activating agent (A) for decomposing and removing the coating material (C) from the surface of the metal fine particles (P1).

(2) The metal fine particle-containing composition according to the disclosure (1), wherein the metal element (M) may be one, two or more types selected from copper, silver, gold, and nickel.

(3) The metal fine particle-containing composition according to the disclosures (1) or (2), wherein a particle diameter of primary particles of the low melting point metal powder (P2) may be 0.5 μm to 50 μm.

(4) The metal fine particle-containing composition according to any one of the disclosures (1) to (3), wherein the low melting point metal powder (P2) may be a tin or a tin alloy in which one, two, or more types selected from copper, silver, zinc, phosphorus, aluminum, and bismuth are solid-solved with tin.

(5) The metal fine particle-containing composition according to any one of the disclosures (1) to (4), wherein the coating material (C) may be a mixture composed of an inorganic compound (C1), an organic compound (C2), or a combination of an inorganic compound (C1) and an organic compound (C2).

(6) The metal fine particle-containing composition according to the disclosure (5), wherein the inorganic compound (C1) may be one, two, or more types selected from oxides, hydroxides, chlorides, carbonates, sulfates, and sulfides of the metal element (M).

(7) The metal fine particle-containing composition according to the disclosure (5) or (6), wherein a ratio ([inorganic compound (C1)/metal fine particles (P1)]×100 (mass %)) of the inorganic compound (C1) in the metal fine particles (P1) may be 0.1 mass % to 70 mass %.

(8) The metal fine particle-containing composition according to the disclosure (5), wherein the organic compound (C2) may be one, two, or more types selected from an organic phosphorus compound, an organic sulfur compound, polyvinylpyrrolidone, polyacrylamide, polyvinyl alcohol, 2-pyrrolidone, and alkyl-2-pyrrolidone.

(9) The metal fine particle-containing composition according to the disclosure (5), wherein the organic compound (C2) may have a boiling point or decomposition point greater than or equal to a bulk melting point of the low melting point metal powder (P2).

(10) The metal fine particle-containing composition according to any one of the disclosures (5), (8), and (9), wherein a ratio ([organic compound (C2)/metal fine particles (P1)]×100 (mass %)) of the organic compound (C2) in the metal fine particles (P1) may be 0.1 to 30 mass %.

(11) The metal fine particle-containing composition according to any one of the disclosures (1) to (10), wherein the activating agent (A) may have one, two, or more carboxyl groups or ester groups.

(12) The metal fine particle-containing composition according to any one of the disclosures (1) to (11), wherein the activating agent (A) may have one, two, or more ether bonds.

(13) The metal fine particle-containing composition according to any one of the disclosures (1) to (12), wherein a boiling point or decomposition point of the activating agent (A) may be greater than or equal to a melting point of the low melting point metal powder (P2).

(14) The metal fine particle-containing composition according to any one of the disclosures (1) to (13), wherein at least a part or an entire surface of the low melting point metal powder (P2) may be coated with an organic compound (C2).

(15) The metal fine particle-containing composition according to any one of the disclosures (1) to (14), further comprising an organic solvent (S) in which the activating agent (A) is soluble, wherein the organic solvent (S) includes alcohols (S1) containing at least one hydroxyl group, and the alcohols (S1) may include one, two, or more types selected from any of methanol, ethanol, 1-propanol, 2-propanol, 1-butanol, 2-butanol, 2-methyl-1-propanol, 2-methyl-2-propanol, 2,2-dimethyl-1-propanol, 1-pentanol, 2-pentanol, 3-pentanol, 3-methyl-1-butanol, 2-methyl-1-butanol, 2,2-dimethyl-1-propanol, 3-methyl-2-butanol, 2-methyl-2-butanol, 1-hexanol, 2-hexanol, 3-hexanol, 2-methyl-2-hexanol, 2-methyl-3-hexanol, 1-heptanol, 2-heptanol, 4-heptanol, 2-ethyl-1-hexanol, 1-octanol, 2-octanol, ethylene glycol, diethylene glycol, 1,2-propanediol, 1,3-propanediol, 1,2-butanediol, 1,3-butanediol, 1,4-butanediol, 2-butene-1,4-diol, 2,3-butanediol, pentanediol, hexanediol, octanediol, glycerin, 1,1,1-trishydroxymethylethane, 2-ethyl-2-hydroxymethyl-1,3-propanediol, 1,2,6-hexane triol, 1,2,3-hexanetriol, and 1,2,4-butanetriol.

(16) The metal fine particle-containing composition according to any one of the disclosures (1) to (15), wherein the organic solvent (S) may contain a glycol monoalkyl ethers (S2) having an ether bond at least at an end of the bond being an alkyl group.

(17) The metal fine particle-containing composition according to any one of the disclosures (1) to (16), wherein the organic solvent (S) may have a boiling point at normal pressure of 100° C. or more and 500° C. or less.

(18) The metal fine particle-containing composition according to any one of the disclosures (1) to (17), further comprising a high melting point metal powder (P3) composed of a metal element (M) with a primary particle diameter of primary particles of the high melting point metal powder (P3) being greater than 500 nm and less than or equal to 50 μm.

For the metal fine particle-containing composition, in addition to the low melting point metal powder (P2) having a melting point of 420° C. or less composed of metal species having a relatively low melting point such as tin, lead, and zinc, metal fine particles (P1) composed of a metal element (M) having a melting point of greater than 420° C. is employed, in which at least a part of the surface of the metal fine particles (P1) is coated with the coating material (C) to achieve joining at a low temperature and a high heat resistance in comparison to those of the conventional composition. The metal element (M) fine particles as main components of the metal fine particles (P1) are dissolved into the low melting point metal powder (P2) at the time of heat joining, and thus the metal element (M) and the low melting point metal powder (P2) produce an alloy or intermetallic compound with an increased melting point so that the materials such as metal pipes and electronic parts are joined. The joining layer of the alloy or the intermetallic compound produced from the metal element (M) and the low melting point metal powder (P2) has a melting point considerably greater than that of the joining layer produced from the low melting point metal powder (P2) alone, improving the heat resistance as well as the joining strength at a relatively high temperature.

As to the dissolving of the metal element (M) as the main component of the metal fine particles (P1) into the low melting point metal powder (P2), the smaller the particle diameter of the metal fine particle is, the more the diffusibility of the metal atom is to be easily dissolved. However, use of the metal fine particles that are free of the coating material (C) causes a problem in which the sintering reaction of the metal fine particles proceeds beforehand at a temperature less than the temperature at which the dissolving occurs. Accordingly, coating at least a part of the surface of the metal fine particles (P1) with the coating material (C) limits the sintering reaction between the metal fine particles. In the temperature range in which the joining layer is produced, the activating agent (A) decomposes and removes the coating material (C) so that dissolution of the metal element (M) into the metal fine particles (P1) is started, achieving the advantage of the increase of the melting point above. Further, the use of the organic solvent (S) as the dispersion medium allows the viscosity of the dispersion liquid to be easily adjusted so that the metal fine particle-containing composition can also be used as a brazing joining material with excellent formability, reducing the braze flow defects.

BRIEF DESCRIPTION OF THE DRAWINGS

Features, advantages, and technical and industrial significance of examples will be described below with reference to the accompanying drawings, in which like numerals denote like elements.

DETAILED DESCRIPTION

Figure 1:
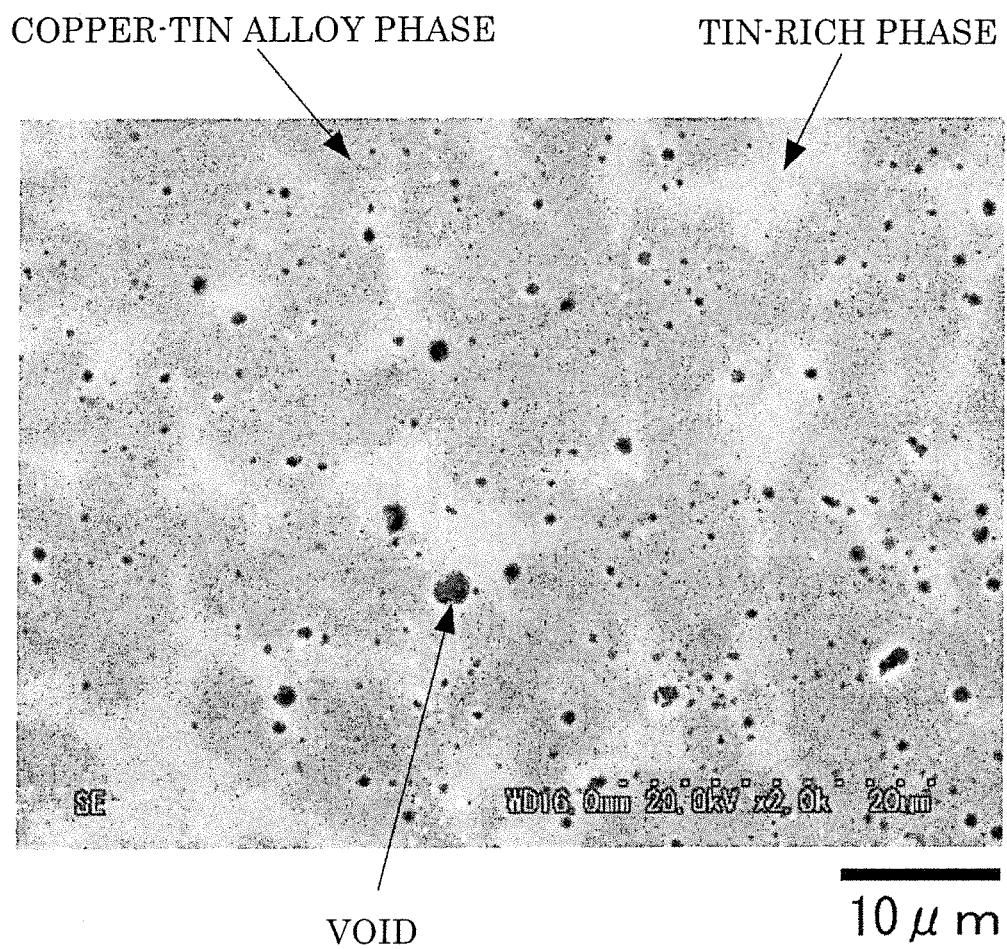
FIG. 1 is a photograph of a cross section of a joined portion of a joined copper base material in Example 17 using a sample prepared in Example 2 taken by a scanning electron microscope (SEM).

Hereinafter, the metal fine particle-containing composition and the production method thereof will be described.

[1] Metal Fine Particle-Containing Composition

The metal fine particle-containing composition includes metal fine particles (P1) composed of a metal element (M) having a bulk melting point of greater than 420° C. and a primary particle diameter of primary particles of the metal fine particles being 1 nm to 500 nm, a part of or an entire surface of the metal fine particles being coated with a coating material (C) that limits sintering between the metal fine particles; a low melting point metal powder (P2) composed of a metal or an alloy having a bulk melting point of 420° C. or less; and an activating agent (A) that decomposes and removes the coating material (C) from the surface of the metal fine particles (P1). The bulk melting point is directed to a melting point at which a remarkable melting point depression fails to appear depending on the metal particle diameter. Accordingly, the melting point below refers to the bulk melting point unless otherwise specified. Further, the activating agent (A) may decompose and remove the coating material (C) from the surface of the metal fine particles (P1) at a temperature greater than or equal to the melting point of the low melting point metal powder (P2), and be dispersed in the liquid organic solvent (S) at room temperature. Moreover, the activating agent (A) may contain a high melting point metal powder (P3) composed of a metal element (M) with a primary particle diameter of primary particles being greater than 500 nm and 50 μm or less.

(1) Metal Fine Particles (P1)

The metal fine particles (P1) are composed of a metal element (M) having a bulk melting point of greater than 420° C. with a primary particle diameter of primary particles of the metal fine particles being 1 nm to 500 nm, a part of or an entire surface of the metal fine particles being coated with a coating material (C) that limits sintering between metal fine particles.

(A) Metal Element (M)

For the metal element (M), any metal element is used as long as the element has a melting point of greater than 420° C. and is mixed with the low melting point alloy powder (P2) to produce an alloy. The reason why the melting point of the metal element (M) is greater than 420° C. is that the metal element fails to produce an alloy at a low temperature with the low melting point alloy powder (P2), but produces an alloy with the low melting point alloy powder (P2) at the time of joining to maintain the melting point of the joined portion high to improve the heat resistance of the joined portion. The particle diameter of the primary particles in the metal fine particle-containing composition is 1 nm to 500 nm, and the melting point in the fine particle state tends to be lower than that of the bulk as the particle diameter is smaller. Accordingly, even if the bulk melting point of the metal element (M) exceeds 420° C., the bulk melting point is set as reference for the melting point in the fine particle state. In consideration of the characteristics such as the melting point at the time of joining and the conductivity after the joining, the metal element (M) producing the metal fine particles (P1) is preferably at least one, two, or more species selected from copper, silver, gold, and nickel. In addition to the metal elements above, metal elements such as palladium, cobalt, chromium, copper, cadmium, and indium that produce metal fine particles may be used as well.

(B) Particle Diameter of Primary Particles of Metal Fine Particles (P1)

An electroless reduction reaction or an electrolytic reduction reaction obtains nano-sized granular metal fine particles with high purity by a relatively easy operation from ions of the metal element (M) in the reduction reaction solution, which fine particles fail to be aggregated into a plated film shape or a dendrite shape. The particle diameter of the primary particles of the metal fine particles (P1) is in the range of 1 nm to 500 nm. Here, the particle diameter of the primary particles refers to the diameter of the primary particles of fine particles such as metals constituting the secondary particles. The primary particle diameter is a value measured using an electron microscope, and includes not only a core portion made of metal element (M) fine particles but also the coating material (C). The particle diameter in the range of 1 nm to 500 nm of the metal fine particles (P1) is directed to a range of measured values of the primary particle diameters of any 100 observable fine particles, and the average primary particle diameter of the fine particles is directed to the number average particle diameter. Generally, as the particle diameter of the metal particles decreases to nanometer size (about 1 nm to 500 nm), the number of constituent atoms per particle decreases and the surface area with respect to the volume of the particle rapidly increases to decrease the melting point and the sintering temperature in comparison to those of the bulk metal. Such a tendency is remarkable when the particle diameter of the metal particles is 100 nm or less. Especially, when the particle diameter of the metal particles is about 10 nm to 20 nm, the surface thereof melts even at a temperature considerably lower than the melting point of the metal of the bulk so that the particles are sintered to each other.

(C) Melting Point of Metal Fine Particles (P1)

The melting point of the bulk of the metal element (M) constituting the metal fine particles (P1) is greater than 420° C. The metal fine particles (P1) having a bulk melting point exceeding 420° C. is used to produce an alloy with the low melting point metal powder (P2) in a molten state when the powder is heated to produce a joined portion. This maintains the melting point of the joined portion relatively high and improves the heat resistance after cooling. As long as the melting point of the bulk of the metal element (M) is greater than the melting point of the bulk of the low melting point metal powder (P2), the advantage of improving the melting point above is obtained.

(D) Coating Material (C)

The coating material (C) as a component of the metal fine particle-containing composition, when it is subjected to the heat joining, at a temperature lower than or equal to the melting point of the bulk of the low melting point metal powder (P2), coats at least a part of or the entire surface of the metal fine particle (P1) to limit sintering between the metal particles. Further, when the coating material (C) is heated such that its temperature is greater than or equal to the melting point of the bulk of the low melting point metal powder (P2), the activating agent (A) decomposes and removes the coating material (C) from the surface of the metal fine particles (P1). Examples of the coating material (C) achieving the advantage above may include an inorganic compound (C1), an organic compound (C2), and inclusions produced from the inorganic compound (C1) and the organic compound (C2). The term coating of the metal fine particles is sometimes used in the art as descriptive terms such as coated, enclosed, protected, and adhered. Further, to obtain a dense joined state with less voids, it is also needed to heat the low melting point metal powder (P2) to a temperature greater than or equal to the melting point thereof so that the low melting point metal is in a preferable molten state. That is, it is desirable that the coating material (C) fail to be completely decomposed until the low melting point metal powder (P2) is molten and also the activating agent (A) fail to be depleted. It is desirable that the decomposition temperature (Tc) of the coating material (C) and the temperature (the boiling point or decomposition point of the activating agent, TA) at which the activating agent (A) starts to act be the melting point (Tp2) of the low melting point metal powder (P2) or more (Tc≥Tp2 and TA≥Tp2). This achieves a high strength joined state with improved heat resistance even with low temperature heating such as conventional soldering. It is sufficient that at least one of the relationships, i.e., Tc≥Tp2 and TA≥Tp2) may be satisfied, and a coating material and an activating agent that decomposes or volatilizes at a temperature lower than the melting point of the low melting point metal powder (P2) may be simultaneously contained.

(D-1) Inorganic Compound (C1)

Examples of the inorganic compound (C1) may include a metal oxide and a metal salt of the metal element (M). Specifically, it is preferable that the inorganic compound (C1) be one, two, or more types selected from any of an oxide, a hydroxide, a chloride, a carbonate, a sulfate, and a sulfide of the metal element (M). The method of coating the surface of the fine particles composed of the metal element (M) with the inorganic compound (C1) is not especially limited. However, it is preferable that the method be one, two, or more types selected from simple gas, plasma treatment, and immersion treatment in a solution containing an inorganic compound. For example, a specific example of the coating of the oxide may include stirring while bubbling a gas containing oxygen gas in an aqueous solution in which the fine particles composed of the metal element (M) are dispersed and adjusting the solution to be in the acidic or neutral state. In addition, surface oxidation treatment is performed by adding an oxidizing agent such as hydrogen peroxide or nitric acid into an aqueous reaction solution in which the fine particles composed of the metal element (M) are dispersed. Even in coating hydroxides, chlorides, carbonates, sulfates, and sulfides, the type of the inorganic compound to be added in the aqueous solution in which the fine particles composed of the metal elements (M) are dispersed is changed to allow inorganic coating treatment to be performed in the same manner. For example, the composition is prepared by reacting an alkali metal hydroxide, hydrogen chloride, carbonic acid, and disulfide ion, for example. The ratio of the inorganic compound (C1) in the metal fine particles (P1) ([inorganic compound (C1)/metal fine particles (P1)]×100 (mass %)) is preferably from 0.1 mass % to 70 mass %, more preferably from 1 mass % to 50 mass % to achieve excellent joining of the electronic parts and the metal materials using the metal fine particle-containing composition.

(D-2) Organic Compound (C2)

The organic compound (C2) is known that an atomic portion having a noncovalent electron pair of a functional group is adsorbed on the surface of the fine particles composed of the metal element (M) to produce a molecular layer. The organic compound (C2) is used to hinder interparticle sintering. It is also expected that the organic compound (C2) generates a repulsive force to fail to allow the metal fine particles to approach each other, and an effect of enhancing the dispersibility of the metal fine particle-containing composition is expected as well. The organic compound (C2) that achieves such an effect may include one, two, or more types selected from any of polyvinylpyrrolidone, polyacrylamide, an organic phosphorus compound, an organic sulfur compound, polyvinyl alcohol, 2-pyrrolidone, and alkyl-2-pyrrolidone. However, the organic compound (C2) is not limited to the examples above as long as it achieves the effects above. Examples of the organic phosphorus compound may include triphenylphosphine, tris(4-methylphenyl) phosphine, 4-(diphenylphosphino) styrene, trioctyl phosphite, tris(2-ethylhexyl) phosphite, triisodecyl phosphite, trioleyl phosphite, triphenyl phosphite, tri-p-tolyl phosphite, tris(2,4-di-tert-butylphenyl) phosphite, tristearyl phosphite, and tris(nonylphenyl) phosphite although the compound is not especially limited to them. Examples of the organic sulfur compound may include bis(4-methacryloyl-thiophenyl) sulfide, bis(4-hydroxyphenyl) sulfide, bis(4-aminophenyl) sulfide, 2-methylthiophenothiazine, dihexyl sulfide, n-octyl sulfide, phenyl sulfide, 4-(phenylthio) toluene, phenyl p-tolylsulfide, 4-tert-butyldiphenyl sulfide, di-tert-butyl sulfide, diphenylene sulfide, furfuryl sulfide, bis (2-mercaptoethyl) sulfide, bis(4-hydroxyphenyl) disulfide, bis(3-hydroxyphenyl) disulfide, diphenyl disulfide, benzyl disulfide, di-n-octyl sulfoxide, methyl phenyl sulfoxide diphenyl sulfoxide, dibenzyl sulfoxide, and p-tolyl sulfoxide. At the time of joining, when the low melting point metal powder (P2) is heated such that its temperature is greater than or equal to the melting point of the bulk of the low melting point metal powder (P2), the activating agent (A) decomposes and removes the organic compound (C2) from the surface of the metal fine particles (P1). Accordingly, the boiling point or decomposition point of the organic compound (C2) is preferably greater than or equal to the bulk melting point of the low melting point metal powder (P2).

The method of coating the surface of the fine particles composed of the metal element (M) with the organic compound (C2) is not particularly limited. In this case, it is preferable to coat the surface of the fine particles in a solution containing the organic compound (C2). In one of specific examples of the coating method, when fine particles composed of a metal element (M) are produced by performing a reduction reaction of ions of the metal element (M) in a reduction reaction aqueous solution by electroless reduction or electrolytic reduction, an organic compound (C2) as an additive is blended into the reduction reaction aqueous solution. In this case, the organic compound (C2) promotes generation of the fine particle crystal nuclei of the metal element (M) in a granular form by reduction of the metal element (M). Further, the organic compound (C2) achieves an advantage in that the organic compound (C2) coats the fine particles of the precipitated metal element (M) to improve the dispersibility and suppress the growth of the granular crystal particles into a form of a plated film or a dendrite. In particular, when a part of the metal fine particles is coated with the organic compound (C2), the organic compound (C2) remarkably achieves the advantage of the dispersibility and the advantage of limiting the growth of the granular crystal particles in the form of a plated film or a dendrite. It may also be possible to improve the coating effect of the organic compound (C2) by adding the metal fine particles produced by the reduction reaction to the solvent containing the organic compound (C2) and performing additional coating with the organic compound (C2). Such an additional coating treatment of the organic compound (C2) may be performed by adding the metal fine particles to a solution of an organic compound (C2) using water or an alcohol as a solvent and stirring. The ratio of the organic compound (C2) in the metal fine particles (P1) ([organic compound (C2)/metal fine particles (P1)]×100 (mass %)) is preferably 0.1 mass % to 30 mass %, more preferably 0.2 mass % to 15 mass % to achieve excellent joining of the electronic parts and the metal materials using the metal fine particle-containing composition.

(2) Low Melting Point Metal Powder (P2)

The low melting point metal powder (P2) corresponds to a metal powder made of a metal or an alloy having a bulk melting point of 420° C. or less, dispersed in the metal fine particle-containing composition. When the low melting point metal powder (P2) is heated and joined, the low melting point metal powder (P2) produces an alloy with all or a part of the metal element (M) in a molten state in the state where the coating material (C) on the surface of the metal fine particles (P1) is decomposed and removed and the metal element (M) diffuses from the surface of the metal fine particle (P1) to produce a joined body. The low melting point metal powder (P2) corresponds to a metal powder made of a metal or an alloy having a bulk melting point of 420° C. or less to melt at a relatively low temperature during heat joining. As a component constituting the low melting point metal powder (P2), it is preferable that an alloy be produced with the metal element (M), and joining between materials at a low temperature be possible. For example, the low melting point metal powder (P2) may preferably be a tin alloy produced by one, two, or more types selected from any of copper, silver, zinc, phosphorus, aluminum, and bismuth is solidly dissolved with tin. Further, the particle diameter of the primary particles of the low melting point metal powder (P2) is preferably 0.5 μm to 50 μm to promptly bring the powder into a molten state at the time of heat joining.

(3) Activating Agent (A)

The activating agent (A) acts to decompose and remove the coating material (C) from the surface of the metal fine particles (P1) when the objects to be joined are joined by the metal fine particle-containing composition. As the activating agent (A), a compound that acts to decompose the coating material (C) such as the inorganic compound (C1) and the organic compound (C2) that coat the surface of the metal fine particles (P1) may be used. In particular, it is preferable to decompose and remove the coating material (C) from the surface of the metal fine particles (P1) at a temperature greater than or equal to the melting point of the low melting point metal powder (P2) when the objects to be joined are joined. In the same manner, as the activating agent (A), it is preferable to decompose the coating material (C) at a temperature greater than or equal to the melting point of the low melting point metal powder (P2). In this case, the activating agent (A) is preferably an organic compound having one or more carboxyl group or ester group in its molecule, and in addition to this, more preferably, an organic compound having one or more ether linkages. The activating agent (A) may be one, two, or more types of organic compounds having a boiling point or decomposition point that is a melting point of the low melting point metal powder (P2) or higher. Examples of the activating agent (A) that acts as described above may include agents obtained by mixing two or more types of abietic acid, adipic acid, fumaric acid, oxalic acid, monoglycerin caprylate, polyglycerin, dehydroabietic acid, dehydroabietic acid glycidyl ester, acrylated dehydroabietic acid, dehydroabiethyl amine, dihydroabietic acid, tetrahydroabietic acid, neoabietic acid, palustric acid, levopimaric acid, maleopimaric acid, polyglycerin fatty acid esters, polyoxyethylene polyglyceryl ethers, and polyoxypropylene polyglyceryl ethers, and organic compounds thereof. It is desirable that the activating agent (A) in the metal fine particle-containing composition fail to be depleted until the low melting point metal is in a molten state to obtain a dense joined state with less voids. As described above, the decomposition temperature (Tc) of the coating material (C) and the temperature (TA) at which the activating agent (A) starts to act are greater than or equal to the melting point (Tp2) of the low melting point metal powder (P2) (Tc≥Tp2 or TA≥Tp2). The temperature (TA) at which the activating agent (A) starts to act is directed to the boiling point or the decomposition point of the activating agent. This achieves a high strength joined state with improved heat resistance even with low temperature heating like conventional soldering. It is sufficient that at least one of the relationships Tc≥Tp2 and TA≥Tp2 is satisfied.

(4) Organic Solvent (S)

The organic solvent (S) may preferably include alcohols (S1) having at least one hydroxyl group in the molecule, a glycol monoalkyl ethers (S2) having an ether joint at least a terminal of which is an alkyl group.

The alcohols (S1) may include one, two, or more types selected from any of methanol, ethanol, 1-propanol, 2-propanol, 1-butanol, 2-butanol, 2-methyl-1-propanol, 2-methyl-2-propanol, 2,2-dimethyl-1-propanol, 1-pentanol, 2-pentanol, 3-pentanol, 3-methyl-1-butanol, 2-methyl-1-butanol, 2,2-dimethyl-1-propanol, 3-methyl-2-butanol, 2-methyl-2-butanol, 1-hexanol, 2-hexanol, 3-hexanol, 2-methyl-2-hexanol, 2-methyl-3-hexanol, 1-heptanol, 2-heptanol, 4-heptanol, 2-ethyl-1-hexanol, 1-octanol, 2-octanol, ethylene glycol, diethylene glycol, 1,2-propanediol, 1,3-propanediol, 1,2-butanediol, 1,3-butanediol, 1,4-butanediol, 2-butene-1,4-diol, 2,3-butanediol, pentanediol, hexanediol, octanediol, glycerin, 1,1,1-trishydroxymethylethane, 2-ethyl-2-hydroxymethyl-1,3-propanediol, 1,2,6-hexane triol, 1,2,3-hexanetriol, and 1,2,4-butanetriol. Considering the reducing property of the surface of the fine particles made of the metal element (M) and the production of the alloy with the low melting point alloy (P2) under the heating condition when the metal fine particle-containing composition is used to join the objects to be joined, the organic solvent (S) may preferably contain 1 mass % to 20 mass %, more preferably 2 mass % to 10 mass % of the reducible alcohols (S1).

Examples of glycol monoalkyl ethers (S2) may include (poly)alkylene glycol monoalkyl ethers such as ethylene glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether; and acetic acid (poly)alkylene glycol monoalkyl ethers such as ethylene glycol monomethyl ether acetate, ethylene glycol monoethyl ether acetate, ethylene glycol mono-n-propyl ether acetate, ethylene glycol mono-n-butyl ether acetate, diethylene glycol monomethyl ether acetate, diethylene glycol monoethyl ether acetate, diethylene glycol mono-n-propyl ether acetate, diethylene glycol mono-n-butyl ether acetate, propylene glycol monomethyl ether acetate, propylene glycol monoethyl ether acetate, 3-methoxybutyl acetate, and 3-methyl-3-methoxybutyl acetate.

Examples of the organic solvent (S) may include the alcohols (S1) above and glycol monoalkyl ethers (S2). In addition to the organic compounds, organic compounds (S3) described below are used. The organic compound (S3) may include one, two, or more types selected from any of an ether compound (S31) represented by the general formula R11-O-R12 (R11 and R12 each independently represent an alkyl group and the number of carbon atoms is 1 to 4), a ketone compound (S32) represented by the general formula R14-C(=O)—R15 (R14 and R15 each independently represent an alkyl group and the number of carbon atoms is 1 to 2), and an amine compound (S33) represented by the general formula R16-(N—R17)-R18 (R16, R17 and R18 each independently represent an alkyl group or a hydrogen atom and the number of carbon atoms is 0 to 2).

Examples of the ether compound (S31) may include diethyl ether, methyl propyl ether, dipropyl ether, diisopropyl ether, methyl t-butyl ether, t-amyl methyl ether, divinyl ether, ethyl vinyl ether, allyl ether, diethylene glycol monoethyl ether, diethylene glycol monoethyl ether acetate, diethylene glycol monobutyl ether, and diethylene glycol monobutyl ether acetate. Examples of the ketone compound (S32) may include acetone, methyl ethyl ketone, and diethyl ketone. Examples of the amine compound (S33) may include triethylamine and diethylamine.

The organic compound (S3) reduces the interaction between the solvent molecules in the mixed solvent and improve the affinity of the dispersed particles to the solvent. Such an effect is generally expected in a solvent having a low boiling point, and in particular, an organic compound having a boiling point of 250° C. or less at ordinary temperature is preferable since an advantage of reducing an interaction between effective solvent molecules is achieved. Among the organic compounds (S3), the ether compound (S31) is particularly preferable since it greatly reduces the interaction between the solvent molecules.

The organic solvent (S) is preferably composed of one, two, or more types of organic compounds, and it is preferable that the boiling point at normal pressure be 100° C. or more and 500° C. or less. As for metal fine particles (P1) composed of a submetallic element (M) and having the particle diameter of 1 to 500 nm, the activating agent (A) removes the coating material (C), and then the reduction or the decomposition of the organic solvent (S) removes the coating material layer including extra oxide, for example, from the surface so that the infiltration of the metal element (M) into the low melting point metal powder (P2) occurs without delay. The boiling point of the organic solvent (S) at normal pressure is preferably 100° C. or more to facilitate infiltration of the metal fine particles (P1) into the low melting point metal powder (P2) at the time of performing heat joining at 100° C. or more. In contrast, when an organic solvent having a boiling point exceeding 500° C. is used, it may be difficult to volatilize and may remain after sintering. Accordingly, it is preferable that the boiling point of the organic solvent (S) be 500° C. or less. Further, the action as described above is likely to proceed in a temperature range that is 50° C. to 40° C. less than the boiling point of the organic solvent (S), and if an organic solvent having a boiling point greater than 450° C. is used, it may be difficult to volatilize and may remain after sintering, and thus the boiling point of the organic solvent (S) is more preferably 150° C. to 450° C.

(5) Metal Fine Particle-Containing Composition
(A) Components and Composition of Metal Fine Particle-Containing Composition As described above, the components constituting the metal fine particle-containing composition include the metal fine particles (P1) in which at least a part of or the entire surface thereof is coated with at least the coating material (C), the low melting point metal powder (P2), and the activating agent (A). The metal fine particles (P1), the low melting point metal powder (P2), and the activating agent (A) may be dispersed in the organic solvent (S), and in the metal fine particle-containing composition, the dispersion includes a suspended state and a state in which at least a part of the components is dissolved. The content of the metal fine particles (P1) containing the coating material (C) in the metal fine particle-containing composition is preferably 0.5 mass % to 50 mass %, more preferably 1 mass % to 20 mass %. If the ratio of the metal fine particles (P1) is less than the lower limit of the range above, the effect of improving the melting point of the joining layer may be reduced, and improvement in heat resistance may fail to be expected. In contrast, if the ratio is greater than the upper limit of the range above, agglomeration of the metal fine particles (P1) occurs, and production of an alloy layer with the low melting point metal powder (P2) may be insufficient. As described above, the content of the coating material (C) in the metal fine particles (P1) is preferably 0.1 mass % to 70 mass %, more preferably 1 mass % to 50 mass % when the coating material (C) is the inorganic compound (C1). The content of the coating material (C) is preferably 0.1 mass % to 30 mass %, more preferably 0.2 mass % to 15 mass % when the coating material (C) is the organic compound (C2). The ratio (mass %) of the amount of metal (P1+P2) including the metal fine particles (P1) and the low melting point metal powder (P2) in the metal fine particle-containing composition is preferably 5 mass % to 95 mass %, more preferably 30 mass % to 90 mass %. If the ratio is less than the lower limit of the range above, the film thickness of the joining layer becomes uneven and cracks and voids may occur. In contrast, when the ratio is greater than the upper limit of the range above, the action of the activating agent (A) for removing the coating material (C) may be reduced, resulting in a joined state with insufficient strength. The ratio of the metal fine particles (P1) and the low melting point metal powder (P2) depends on the alloy/metal species to be produced, and thus cannot be generally specified. The content ratio of the activating agent (A) in the metal fine particle-containing composition is preferably 0.005 to 5, more preferably 0.1 to 1, by a molar ratio with the coating material (C). If the ratio is less than the lower limit of the range above, the removing action of the coating material (C) may fail to be sufficiently exhibited. In contrast, when the ratio exceeds the upper limit of the range, a large amount of the unreacted activating agent (A) remains, causing an uneven joined state. Also, the metal fine particle-containing composition may include a high melting point metal powder (P3) composed of a metal element (M) having a primary particle diameter of primary particles greater than 500 nm and 50 μm or less to adjust the viscosity of the composition.

(B) Method of Producing Metal Fine Particle-Containing Composition

It is desirable to add the metal fine particles (P1) in which a part of or the entire surface thereof is coated with the coating material (C), the low melting point metal powder (P2), and the activating agent (A), and employ stirring means to improve dispersibility. As a stirring method of the dispersion solution, although a known stirring method may be employed, it is preferable to employ an ultrasonic irradiation method. The ultrasonic irradiation time is not particularly limited, and thus any time may be optionally selected. For example, the ultrasonic irradiation time may be optionally set from 5 to 60 minutes, and the longer the irradiation time is, the better the dispersibility improves.

(C) Use of Metal Fine Particle-Containing Composition

The metal fine particle-containing composition is used in the same manner as in the conductive paste for electronic materials, for example, to join the electronic parts with wiring producing materials, printed circuit, internal wiring of semiconductor, and printed circuit board.

(6) Joined Body Produced of Metal Fine Particle-Containing Composition

The joined body produced of the metal fine particle-containing composition is obtained by disposing (or patterning) the composition on the joined surfaces of objects to be joined, heating and joining the composition, and then cooling the composition until the temperature thereof becomes room temperature. In such a joined body, a joining layer having a porosity of about 5% to 15% by volume depending on the joining conditions such as the heating temperature and time is produced. The joined body obtained by using the metal fine particle-containing composition of the present disclosure improves mechanical strength such as tensile strength and die shear strength and heat resistance.

EXAMPLES

Our compositions and methods will be specifically described with reference to examples, but this disclosure is not limited to these examples. The evaluation methods in the examples and comparative examples will be described below.

(1) Method of Measuring Primary Particle Diameter of Metal Fine Particles (P1)

The range of primary particle diameter in Examples 1 to 16 and Comparative Examples 1 to 4 is obtained by measuring the primary particle diameter of any 80 fine particles by the observation using a scanning electron microscope SEM in which the 5% of the number of the fine particles having the smallest particle diameter and 5% of the number of the fine particles having the largest particle diameter are excluded to obtain the measurement value range of the primary particle diameter of remaining 90% of the number of the fine particles. Accordingly, an average primary particle diameter of the fine particles is directed to an average value of the measured values of the primary particle diameters of the remaining 90% of the number of the particles. In preparing the samples for observation, the solvent was dried and removed while allowing the fine particles dispersed in ethanol to pass through a porous alumina filter (manufactured by Whatman, product name: Anodisc (registered trademark)) and then observed with a scanning electron microscope SEM.

(2) Method of Identifying Metal Composition of Fine Particles

Crystal structure analysis was performed by X-ray diffraction measurement using an X-ray diffraction measurement apparatus (model: Geigerflex RAD-A, manufactured by Rigaku Corporation) employing CuKα as an X-ray source.

(3) Method of Identifying Coating Material (C) of Fine Particles

For identification of the inorganic compound on the surface of the fine particles, the compound was analyzed using an energy dispersive X-ray spectrometer (SEM-EDX) attached to the scanning electron microscope or the transmission electron microscope. For identification of the organic compound on the surface of the fine particles, the compound was analyzed using a microscopic Raman spectroscopic apparatus (model: Nanofinder@30, manufactured by Tokyo Instruments Co., Ltd.) and a Fourier transform infrared spectrophotometer (model: FT/IR-4100, manufactured by JASCO Corporation). In the microscopic Raman spectroscopic apparatus, a sample was applied to a nano-sized concavo-convex structure (Ag or Cu) that increases the Raman scattering intensity by localized surface plasmon resonance as necessary, and analyzed.

(4) Method of Measuring Content of Coating Material (C) of Fine Particles

The content of the inorganic compound was obtained using an X-ray diffraction measurement apparatus (model: Geigerflex RAD-A, manufactured by Rigaku Corporation) from the intensity ratio between the peak height of the main peak at 2θ as the maximum intensity of the metal element (M) and the peak height of the main peak at 2θ as the maximum intensity of the inorganic compound of the metal element (M) in the X-ray diffraction pattern obtained by using the CuKα as the X-ray source. Specifically, first, from the peak intensity ratio obtained from the standard sample of the powder in which the powder of the metal element (M) and the powder of the inorganic compound of the metal element (M) are mixed at a known mass ratio, the calibration curve for the mass ratio was prepared in advance. Based on the calibration curve, the ratio of the inorganic compound (C1) as the coating material in the metal fine particles (P1), i.e., ([inorganic compound (C1)/metal fine particles (P1)]× 100 (mass %)) was obtained from the main peak intensity ratio of the metal fine particles (P1) in the X-ray diffraction pattern. Further, as for the content of the organic compound (C2) as the coating material, the ratio of the organic compound (C2) in the metal fine particles (P1), i.e., (([organic compound (C2)/metal fine particles (P1)]×100 (mass %)) was obtained using a carbon/sulfur analyzer (model: EMIA-920V2 manufactured by Horiba Seisakusho Co., Ltd.). However, when the measured value falls below the detection limit of the created calibration curve or the analytical device, in principle, the substance to be measured was calculated as undetected.

Example 1

Metal fine particle-containing composition was prepared to contain copper fine particles produced by electroless reduction as metal fine particles, tin powder (100% Sn) as low melting point metal powder, abietic acid as an activating agent, glycerin and diethylene glycol monoethyl ether as an organic solvent.

(1) Preparation of Copper Fine Particles

After 14.6 g of copper hydroxide as a source of copper as a metal element and 5 g of polyvinylpyrrolidone as an organic dispersing agent were added to 960 g of distilled water and stirred, obtained aqueous solution was transferred to a nitrogen gas atmosphere. Next, 1 L (liter) of a reduction reaction aqueous solution was prepared by adding sodium borohydride solution as a reducing agent to the aqueous solution. The oxidation-reduction potential of the prepared reduction reaction aqueous solution was −400 mV or less on the basis of the standard hydrogen electrode, and the pH was about 13. As a result of continuous electroless reduction reaction by appropriately adding dropwise the reducing agent at a bath temperature of 20° C. for 60 minutes with stirring the reduction reaction aqueous solution such that the oxidation-reduction potential became −400 mV or less, copper fine particles precipitated in the solution. The obtained copper fine particles dispersed aqueous solution was placed in a centrifugal separator so that the copper fine particles component was precipitated and collected. Ethanol was added to the collected copper fine particles, followed by stirring and washing, and then twice of ethanol washing operation for collecting the copper fine particles by the centrifugal separator, and then washing with water, and drying and removing of the solvent to obtain 5 g of the copper fine particles.

(2) Evaluation of Produced Copper Fine Particles (A) Identification of Primary Particle Diameter and Metallic Species of Copper Fine Particles As a result of observation with the scanning electron microscope (SEM-EDX), the primary particle diameter of the produced copper fine particles was 20 nm to 200 nm and the average primary particle diameter was 35 nm. Further, when the copper fine particles were analyzed with an energy dispersive X-ray analyzer (EDX), the metal composition was 100 mass % of copper.

(B) Identification of Coating Material of Metal Fine Particles

The obtained copper fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from polyvinylpyrrolidon as the organic compound (C2).

(C) Content of Coating Material

From the analysis of the copper fine particles using the carbon/sulfur analyzer, the ratio of the polyvinylpyrrolidone as the organic compound (C2) in the coated copper fine particles (P1), i.e., ([organic compound (C2)/copper fine particles (P1)]×100 (mass %)) was 0.1 mass %.

(3) Preparation of Metal Fine Particle-Containing Composition

After adding 0.6 g of abietic acid as an activating agent to 1.2 g of glycerin and 0.2 g of diethylene glycol monoethyl ether, the mixture was thoroughly stirred using an ultrasonic homogenizer to prepare a mixed solvent. Next, 1.6 g of the obtained copper fine particles and 6.4 g of tin powder having an average particle diameter of 5 μm were added to the mixed solvent under a nitrogen atmosphere, and the mixture was kneaded with a mortar and a pestle to prepare the metal fine particle-containing composition.

Example 2

Metal fine particle-containing composition was prepared to contain copper fine particles produced by electroless reduction as metal fine particles, tin powder (100% Sn) as low melting point metal powder, abietic acid as an activating agent, and glycerin and diethylene glycol monobutyl ether as an organic solvent. Coating process was also performed to produce a hydroxide on the surface of the copper fine particles.

(1) Preparation of Copper Fine Particles

Copper fine particles were obtained in the same manner as in Example 1.

(2) Coating with Inorganic Compound (C1)

The copper fine particles were added to an aqueous solution of calcium hydroxide (1 g/liter), and the stirring state was maintained for 10 minutes at a bath temperature of 10° C. Thereafter, the fine particles were collected on an aluminum mesh on which a carbon supporting film was attached, and the solvent removed by washing with water, washing with alcohol, and drying to coat the copper fine particles with the copper hydroxide as the inorganic compound (C1).

(3) Evaluation of Produced Copper Fine Particles (A) Identification of Primary Particle Diameter and Metallic Species of Copper Fine Particles As a result of observation with the scanning electron microscope (SEM-EDX), the primary particle diameter of the produced copper fine particles was 20 nm to 200 nm and the average primary particle diameter was 35 nm. Further, when the copper fine particles were analyzed with an energy dispersive X-ray analyzer (EDX), the metal composition was 100 mass % of copper.

(B) Identification of Coating Material of Metal Fine Particles

As a result of observation of the obtained copper fine particles using a transmission electron microscope (TEM) and an attached energy dispersive X-ray spectrometer (TEM-EDX), copper was found in the core portion and copper hydroxide ($Cu(OH)_2$) was found in the shell portion of the primary particles of the copper fine particles. Further, the copper fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from polyvinylpyrrolidon. As a result of the identification, it was checked that the copper fine particles were coated with the coating material produced by coexisting copper hydroxide as the inorganic compound (C1) and polyvinylpyrrolidone as the organic compound (C2).

(C) Content of Coating Material

From the analysis of the main peak intensity ratio by X-ray diffraction, the ratio of the copper hydroxide as the inorganic compound (C1) in the coated copper fine particles (P1), i.e., ([inorganic compound (C1)/copper fine particles (P1)]×100 (mass %)) was 10.5 mass %. Further, from the analysis of the copper fine particles using the carbon/sulfur analyzer, the ratio of the polyvinylpyrrolidone as the organic compound (C2) in the coated copper fine particles (P1), i.e., ([organic compound (C2)/copper fine particles (P1)]×100 (mass %)) was 0.1 mass %.

(4) Preparation of Metal Fine Particle-Containing Composition

After adding 0.6 g of abietic acid as an activating agent to 1.2 g of glycerin and 0.2 g of diethylene glycol monobutyl ether, the mixture was thoroughly stirred using an ultrasonic homogenizer to prepare a mixed solvent. Next, 1.6 g of the obtained copper fine particles and 6.4 g of tin powder having an average particle diameter of 5 μm were added to the mixed solvent under a nitrogen atmosphere, and the mixture was kneaded with a mortar and a pestle to prepare the metal fine particle-containing composition.

Example 3

Metal fine particle-containing composition was prepared to contain copper fine particles produced by electroless reduction as metal fine particles, tin powder (100% Sn) as low melting point metal powder, monoglycerol caprylate as an activating agent, and glycerin as an organic solvent. Coating process was also performed to produce an oxide on the surface of the copper fine particles.

(1) Preparation of Copper Fine Particles

Copper fine particles were obtained in the same manner as in Example 1.

(2) Coating with Inorganic Compound (C1)

The copper fine particles were added to an aqueous solution of acetic acid (1 volume %), and the stirring state was maintained for 120 minutes at a bath temperature of 40° C. Thereafter, the fine particles were collected on an aluminum mesh on which a carbon supporting film was attached, and the solvent was removed by washing with water, washing with alcohol, and drying to coat the copper fine particles with the cuprous oxide as the inorganic compound (C1).

(3) Evaluation of Produced Copper Fine Particles (A) Identification of Primary Particle Diameter and Metallic Species of Copper Fine Particles As a result of observation with the scanning electron microscope (SEM-EDX), the primary particle diameter of the produced copper fine particles was 20 nm to 200 nm and the average primary particle diameter was 50 nm. Further, when the copper fine particles were analyzed with an energy dispersive X-ray analyzer (EDX), the metal composition was 100 mass % of copper.

(B) Identification of Coating Material of Metal Fine Particles

As a result of observation of the obtained copper fine particles using a transmission electron microscope (TEM) and an attached energy dispersive X-ray spectrometer (TEM-EDX), copper was found in the core portion and cuprous oxide ($Cu_2O$) was found in the shell portion of the primary particles of the copper fine particles. Further, the copper fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from polyvinylpyrrolidon. As a result of the identification, it was checked that the copper fine particles were coated with the coating material produced by coexisting cuprous oxide as the inorganic compound (C1) and polyvinylpyrrolidone as the organic compound (C2).

(C) Content of Coating Material

From the analysis of the main peak intensity ratio by X-ray diffraction, the ratio of the cuprous oxide as the inorganic compound (C1) in the coated copper fine particles (P1), i.e., ([inorganic compound (C1)/copper fine particles (P1)]×100 (mass %)) was 70 mass %. From the analysis of the copper fine particles using the carbon/sulfur analyzer, the ratio of the polyvinylpyrrolidone as the organic compound (C2) in the coated copper fine particles (P1), i.e., ([organic compound (C2)/copper fine particles (P1)]×100 (mass %)) was 0.1 mass %.

(4) Preparation of Metal Fine Particle-Containing Composition

After adding 0.6 g of monoglycerol caprylate as an activating agent to 1.4 g of glycerin, the mixture was thoroughly stirred using an ultrasonic homogenizer to prepare a mixed solvent. Next, 1.6 g of the obtained copper fine particles and 6.4 g of tin powder having an average particle diameter of 5 μm were added to the mixed solvent under a nitrogen atmosphere, and the mixture was kneaded with a mortar and a pestle to prepare the metal fine particle-containing composition.

Example 4

Metal fine particle-containing composition was prepared to contain copper fine particles produced by electroless reduction as metal fine particles, tin-silver-copper powder (96.5% Sn-3% Ag-0.5% Cu) as low melting point metal powder, adipic acid as an activating agent, and glycerin and diethylene glycol monobutyl ether as an organic solvent. Coating process was also performed to produce a sulfate on the surface of the metal fine particles.

(1) Preparation of Copper Fine Particles

Copper fine particles were obtained in the same manner as in Example 1.

(2) Coating with Inorganic Compound (C1)

The copper fine particles were added to an aqueous solution of sulfuric acid (0.2 mass %), and the stirring state was maintained for 5 minutes at a bath temperature of 10° C. Thereafter, the fine particles were collected on an aluminum mesh on which a carbon supporting film was attached, and the solvent was removed by washing with water, washing with alcohol, and drying to coat the copper fine particles with the copper sulfate as the inorganic compound (C1).

(3) Evaluation of Produced Copper Fine Particles (A) Identification of Primary Particle Diameter and Metallic Species of Copper Fine Particles As a result of observation with the scanning electron microscope (SEM-EDX), the primary particle diameter of the produced copper fine particles was 20 nm to 200 nm and the average primary particle diameter was 40 nm. Further, when the copper fine particles were analyzed with an energy dispersive X-ray analyzer (EDX), the metal composition was 100 mass % of copper.

(B) Identification of Coating Material of Metal Fine Particles

As a result of observation of the obtained copper fine particles using a transmission electron microscope (TEM) and an attached energy dispersive X-ray spectrometer (TEM-EDX), copper was found in the core portion and copper sulfate ($Cu(SO)_4$) was found in the shell portion of the primary particles of the copper fine particles. Further, the copper fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from polyvinylpyrrolidon. As a result of the identification, it was checked that the copper fine particles were coated with the coating material produced by coexisting copper sulfate as the inorganic compound (C1) and polyvinylpyrrolidone as the organic compound (C2).

(C) Content of Coating Material

From the analysis of the main peak intensity ratio by X-ray diffraction, the ratio of the copper sulfate as the inorganic compound (C1) in the coated copper fine particles (P1), i.e., ([inorganic compound (C1)/copper fine particles (P1)]×100 (mass %)) was 0.1 mass %. From the analysis of the copper fine particles using the carbon/sulfur analyzer, the ratio of the polyvinylpyrrolidone as the organic compound (C2) in the coated copper fine particles (P1), i.e., ([organic compound (C2)/copper fine particles (P1)]×100 (mass %)) was 0.1 mass %.

(4) Preparation of Metal Fine Particle-Containing Composition

After adding 0.6 g of adipic acid as an activating agent to 1.2 g of glycerin and 0.2 g of diethylene glycol monobutyl ether, the mixture was thoroughly stirred using an ultrasonic homogenizer to prepare a mixed solvent. Next, 1.6 g of the obtained copper fine particles and 6.4 g of tin-silver-copper powder having an average particle diameter of 10 μm were added to the mixed solvent under a nitrogen atmosphere, and the mixture was kneaded with a mortar and a pestle to prepare the metal fine particle-containing composition.

Example 5

Metal fine particle-containing composition was prepared to contain copper fine particles produced by electroless reduction as metal fine particles, tin-zinc-aluminum powder (91.99% Sn-8% Zn-0.01% Al) as low melting point metal powder, fumaric acid as an activating agent, and glycerin and diethylene glycol monobutyl ether as an organic solvent. Coating process was also performed to produce a cuprous chloride on the surface of the metal fine particles.

(1) Preparation of Copper Fine Particles

Copper fine particles were obtained in the same manner as in Example 1.

(2) Coating with Inorganic Compound (C1)

Copper fine particles were placed in an atmosphere controlled heat treatment furnace and kept at 40° C. for 60 minutes in a mixed gas atmosphere of chlorine (1 ppm). Thereafter, the fine particles were collected on an aluminum mesh on which a carbon supporting film was attached, and the solvent was removed by washing with water, washing with alcohol, and drying to coat the copper fine particles with the cupric chloride as the inorganic compound (C1).

(3) Evaluation of Produced Copper Fine Particles
(A) Identification of Primary Particle Diameter and Metallic Species of Copper Fine Particles As a result of observation with the scanning electron microscope (SEM-EDX), the primary particle diameter of the produced copper fine particles was 20 nm to 200 nm and the average primary particle diameter was 45 nm. Further, when the copper fine particles were analyzed with an energy dispersive X-ray analyzer (EDX), the metal composition was 100 mass % of copper.

(B) Identification of Coating Material of Metal Fine Particles

As a result of observation of the obtained copper fine particles using a transmission electron microscope (TEM) and an attached energy dispersive X-ray spectrometer (TEM-EDX), copper was found in the core portion and cupric chloride ($Cu(Cl)_2$) was found in the shell portion of the primary particles of the copper fine particles. Further, the copper fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from polyvinylpyrrolidon. As a result of the identification, it was checked that the copper fine particles were coated with the coating material produced by coexisting cupric chloride as the inorganic compound (C1) and polyvinylpyrrolidone as the organic compound (C2).

(C) Content of Coating Material (C)

From the analysis of the main peak intensity ratio by X-ray diffraction, the ratio of the cupric chloride as the inorganic compound (C1) in the coated copper fine particles (P1), i.e., ([inorganic compound (C1)/copper fine particles (P1)]×100 (mass %)) was 0.9 mass %. From the analysis of the copper fine particles using the carbon/sulfur analyzer, the ratio of the polyvinylpyrrolidone as the organic compound (C2) in the coated copper fine particles (P1), i.e., ([organic compound (C2)/copper fine particles (P1)]×100 (mass %)) was 0.1 mass %.

(4) Preparation of Metal Fine Particle-Containing Composition

After adding 0.6 g of fumaric acid as an activating agent to 1.2 g of glycerin and 0.2 g of diethylene glycol monobutyl ether, the mixture was thoroughly stirred using an ultrasonic homogenizer to prepare a mixed solvent. Next, 1.6 g of the obtained copper fine particles and 6.4 g of tin-zinc-aluminum powder having an average particle diameter of 10 μm were added to the mixed solvent under a nitrogen atmosphere, and the mixture was kneaded with a mortar and a pestle to prepare the metal fine particle-containing composition.

Example 6

Metal fine particle-containing composition was prepared to contain copper fine particles produced by electroless reduction as metal fine particles, tin-bismuth powder (42% Sn-58% Bi) as low melting point metal powder, oxalic acid as an activating agent, and ethylene glycol and 1-propanol as an organic solvent. Coating process was also performed to produce a carbonate on the surface of the metal fine particles.

(1) Preparation of Copper Fine Particles

Copper fine particles were obtained in the same manner as in Example 1 except that 70 g of polyvinylpyrrolidone as an organic dispersing agent was employed and the oxidation-reduction potential was controlled to be not more than −800 mV.

(2) Coating with Inorganic Compound (C1)

The copper fine particles were added to an aqueous solution of sodium hydrogen carbonate (5 mass %), and the stirring state was maintained for 5 minutes at a bath temperature of 20° C. Thereafter, the fine particles were collected on an aluminum mesh on which a carbon supporting film was attached, and the solvent was removed by washing with water, washing with alcohol, and drying to coat the copper fine particles with the copper sulfate as the inorganic compound (C1).

(3) Evaluation of Produced Copper Fine Particles
(A) Identification of Primary Particle Diameter and Metallic Species of Copper Fine Particles As a result of observation with the scanning electron microscope (SEM-EDX), the primary particle diameter of the produced copper fine particles was 1 nm to 50 nm and the average primary particle diameter was 15 nm. Further, when the copper fine particles were analyzed with an energy dispersive X-ray analyzer (EDX), the metal composition was 100 mass % of copper.

(B) Identification of Coating Material of Metal Fine Particles

As a result of observation of the obtained copper fine particles using a transmission electron microscope (TEM) and an attached energy dispersive X-ray spectrometer (TEM-EDX), copper was found in the core portion and copper carbonate ($Cu(CO)_3$) was found in the shell portion of the primary particles of the copper fine particles. Further, the copper fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from polyvinylpyrrolidon. As a result of the identification, it was checked that the copper fine particles were coated with the coating material produced by coexisting copper carbonate as the inorganic compound (C1) and polyvinylpyrrolidone as the organic compound (C2).

(C) Content of Coating Material

From the analysis of the main peak intensity ratio by X-ray diffraction, the ratio of the copper carbonate as the inorganic compound (C1) in the coated copper fine particles (P1), i.e., ([inorganic compound (C1)/copper fine particles (P1)]×100 (mass %)) was 4 mass %. From the analysis of the copper fine particles using the carbon/sulfur analyzer, the ratio of the polyvinylpyrrolidone as the organic compound (C2) in the coated copper fine particles (P1), i.e., ([organic compound (C2)/copper fine particles (P1)]×100 (mass %)) was 10 mass %.

(4) Preparation of Metal Fine Particle-Containing Composition

After adding 0.3 g of oxalic acid as an activating agent to 2 g of ethylene glycol and 0.7 g of 1-propanol, the mixture was thoroughly stirred using an ultrasonic homogenizer to prepare a mixed solvent. Next, 1.4 g of the obtained copper fine particles and 5.6 g of tin-bismuth powder having an average particle diameter of 0.5 μm were added to the mixed solvent under a nitrogen atmosphere, and the mixture was kneaded with a mortar and a pestle to prepare the metal fine particle-containing composition.

Example 7

Metal fine particle-containing composition was prepared to contain copper fine particles produced by electroless reduction as metal fine particles, zinc powder (100% Zn) as low melting point metal powder, polyglycerine as an activating agent, and glycerin as an organic solvent.

(1) Preparation of Copper Fine Particles

Copper fine particles were obtained in the same manner as in Example 1 except that 5 g of polyvinylpyrrolidone and 100 g of polyacrylamide as an organic dispersing agent were employed and the oxidation-reduction potential was controlled to be not more than −300 mV.

(2) Evaluation of Produced Copper Fine Particles (A) Identification of Primary Particle Diameter and Metallic Species of Copper Fine Particles As a result of observation with the scanning electron microscope (SEM-EDX), the primary particle diameter of the produced copper fine particles was 40 nm to 500 nm and the average primary particle diameter was 70 nm. Further, when the copper fine particles were analyzed with an energy dispersive X-ray analyzer (EDX), the metal composition was 100 mass % of copper.

(B) Identification of Coatings of Metal Fine Particles

The obtained copper fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from polyvinylpyrrolidon and polyacrylamide as the organic compounds (C2).

(C) Content of Coating Material

From the analysis of the copper fine particles using the carbon/sulfur analyzer, the ratio of the polyvinylpyrrolidone and polyacrylamide as the organic compounds (C2) in the coated copper fine particles (P1), i.e., ([organic compounds (C2)/copper fine particles (P1)]×100 (mass %)) was 30 mass %.

(3) Preparation of Metal Fine Particle-Containing Composition

After adding 0.6 g of polyglyceric acid as an activating agent to 1.4 g of glycerin, the mixture was thoroughly stirred using an ultrasonic homogenizer to prepare a mixed solvent. Next, 1.6 g of the obtained copper fine particles and 6.4 g of zinc powder having an average particle diameter of 5 μm were added to the mixed solvent under a nitrogen atmosphere, and the mixture was kneaded with a mortar and a pestle to prepare the metal fine particle-containing composition.

Example 8

Metal fine particle-containing composition was prepared to contain copper fine particles produced by electroless reduction as metal fine particles, tin-zinc-bismuth powder (89% Sn-8% Zn-3% Bi) as low melting point metal powder, monoglycerol caprylate as an activating agent, and glycerin as an organic solvent. Further, additional coating treatment of N-methyl-2-pyrrolidone was also performed.

(1) Preparation of Copper Fine Particles

One liter (L) of reduction reaction aqueous solution was prepared by employing 20 g of monohydrate of copper (II) acetate as a source of copper as a metal element, 30 g of N-vinyl-2-pyrrolidone (number of carbon atoms: 6) as an organic dispersing agent, and 1.76 g of calcium acetate monohydrate as a source of alkaline earth metal element. The pH of the reduction reaction aqueous solution was about 6.0. Next, in the solution, voltage is applied between the rod cathode (cathode electrode) made of SUS 304 and the platinum plate anode (anode electrode) at a bath temperature of 10° C. such that the oxidation-reduction potential of the cathode is −1000 mV or less on the basis of the standard hydrogen electrode to continue the electrolytic reduction reaction for 30 minutes. As a result, copper fine particles were precipitated in the vicinity of the outer surface of the cathode. The reaction aqueous solution after the reduction reaction was completed was collected on an aluminum mesh on which a carbon supporting film was attached, and removed by washing with ethanol, washing with water, and drying, and then 2.5 g of copper fine particles were obtained.

(2) Coating with Organic Compound (C2)

The copper fine particles were added to a methanol solution of N-methyl-2-pyrrolidone (10 g/liter), and the stirring state was maintained for 10 minutes at a bath temperature of 10° C. Thereafter, the fine particles were collected on an aluminum mesh on which a carbon supporting film was attached, and the solvent was removed by washing with water, washing with alcohol, and drying to coat the copper fine particles with the N-methyl-2-pyrrolidone as the organic compound (C2).

(3) Evaluation of Produced Copper Fine Particles (A) Identification of Primary Particle Diameter and Metallic Species of Copper Fine Particles As a result of observation with the scanning electron microscope (SEM-EDX), the primary particle diameter of the produced copper fine particles was 1 nm to 100 nm and the average primary particle diameter was 20 nm. Further, when the copper fine particles were analyzed with an energy dispersive X-ray analyzer (EDX), the metal composition was 100 mass % of copper.

(B) Identification of Coating Material of Metal Fine Particles

The obtained copper fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from N-vinyl-2-pyrrolidone and N-methyl-2-pyrrolidone as the organic compounds (C2).

(C) Content of Coating Material

From the analysis of the copper fine particles using the carbon/sulfur analyzer, the ratio of the N-vinyl-2-pyrrolidone and N-methyl-2-pyrrolidone as the organic compounds (C2) in the coated copper fine particles (P1), i.e., ([organic compounds (C2)/copper fine particles (P1)]×100 (mass %)) was 2 mass %.

(4) Preparation of Metal Fine Particle-Containing Composition

After adding 0.6 g of monoglycerol caprylate as an activating agent to 1.4 g of glycerin, the mixture was thoroughly stirred using an ultrasonic homogenizer to prepare a mixed solvent. Next, 1.6 g of the obtained copper fine particles and 6.4 g of tin-zinc-bismuth powder having an average particle diameter of 5 μm were added to the mixed solvent under a nitrogen atmosphere, and the mixture was kneaded with a mortar and a pestle to prepare the metal fine particle-containing composition.

Example 9

Metal fine particle-containing composition was prepared to contain copper-nickel alloy fine particles produced by electroless reduction as metal fine particles, tin-zinc-bismuth powder (89% Sn-8% Zn-3% Bi) as low melting point metal powder, monoglycerol caprylate as an activating agent, and glycerin as an organic solvent. A coating process was also performed to produce an oxide on the surface of the metal fine particles.

(1) Preparation of Copper-Nickel Alloy Fine Particles

The same processes as in Example 8 were performed except for adding 20 g of monohydrate of copper (II) acetate as a supply source of copper as a metal element and 2.6 g of tetrahydrate of nickel (II) acetate as a supply source of nickel to obtain 2.5 g of copper-nickel alloy fine particles.

(2) Coating with Inorganic Compound (C1)

The copper-nickel alloy fine particles were added to an aqueous solution of acetic acid (1% by volume), and the stirring state was maintained for 120 minutes at a bath temperature of 40° C. Thereafter, the fine particles were collected on an aluminum mesh on which a carbon supporting film was attached, and the solvent was removed by washing with water, washing with alcohol, and drying to coat the copper-nickel alloy fine particles with the cuprous oxide and nickel oxide.

(3) Evaluation of Produced Copper-Nickel Alloy Fine Particles (A) Identification of Primary Particle Diameter and Metallic Species of Copper-Nickel Alloy Fine Particles As a result of observation with the scanning electron microscope (SEM-EDX), the primary particle diameter of the produced copper-nickel alloy fine particles was 30 nm to 150 nm and the average primary particle diameter was 50 nm. The copper-nickel alloy fine particles were analyzed with an energy dispersive X-ray analyzer (EDX), and it was found that the metal composition was 90% by mass of copper and 10% by mass of nickel (hereinafter referred to as copper-10% nickel alloy).

(B) Identification of Coating Material of Metal Fine Particles

As a result of observation of the obtained copper-nickel alloy fine particles using a transmission electron microscope (TEM) and an attached energy dispersive X-ray spectrometer (TEM-EDX), copper and nickel were found in the core portion and cuprous oxide ($Cu_2O$) and nickel oxide (NiO) were found in the shell portion of the primary particles of the copper-nickel alloy fine particles. Further, the copper-nickel alloy fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from N-vinyl-2-pyrrolidone. As a result of the identification, it was checked that the copper fine particles were coated with the coating material produced by coexisting cuprous oxide and nickel oxide as the inorganic compounds (C1) and N-vinyl-2-pyrrolidone as the organic compound (C2).

(C) Content of Coating Material

From the analysis of the main peak intensity ratio by X-ray diffraction, the ratio of the cuprous oxide and nickel oxide as the inorganic compounds (C1) in the coated copper-nickel alloy fine particles (P1), i.e., ([inorganic compounds (C1)/copper fine particles (P1)]×100 (mass %)) was 50 mass %. From the analysis of the copper-nickel alloy fine particles using the carbon/sulfur analyzer, the ratio of the N-vinyl-2-pyrrolidone and N-methyl-2-pyrrolidone as the organic compounds (C2) in the coated copper-nickel alloy fine particles (P1), i.e., ([organic compounds (C2)/copper fine particles (P1)]×100 (mass %)) was 1 mass %.

(4) Preparation of Metal Fine Particle-Containing Composition

After adding 0.6 g of monoglycerol caprylate as an activating agent to 1.4 g of glycerin, the mixture was thoroughly stirred using an ultrasonic homogenizer to prepare a mixed solvent. Next, 1.6 g of the obtained copper-nickel alloy fine particles and 6.4 g of tin-zinc-bismuth powder having an average particle diameter of 5 μm were added to the mixed solvent under a nitrogen atmosphere, and the mixture was kneaded with a mortar and a pestle to prepare the metal fine particle-containing composition.

Example 10

Metal fine particle-containing composition was prepared to contain gold fine particles produced by polyol reduction as metal fine particles, tin powder (100% Sn) as low melting point metal powder, polyglycerine as an activating agent, and ethylene glycol as an organic solvent.

(1) Preparation of Gold Fine Particles

A reduction reaction solution was prepared by adding 10 g of chloroauric acid tetrahydrate as a source of gold as a metal element, 50 g of polyvinylpyrrolidone as an organic dispersing agent, and 2 g of polyvinyl alcohol to 500 g of ethylene glycol. As the prepared reduction reaction solution was kept reacting at a bath temperature of 130° C. for 60 minutes while stirring, gold fine particles precipitated in the solution. The gold fine particle dispersion liquid thus obtained was diluted with ethanol and placed in a centrifugal separator to precipitate and collect gold fine particle components. Ethanol was added to the collected gold fine particles, followed by stirring and washing, and then twice of ethanol washing operation for collecting the gold fine particles by the centrifugal separator, and then washing with water, and drying and removing of the solvent to obtain 2 g of the gold fine particles.

(2) Evaluation of Produced Gold Fine Particles (A) Identification of Primary Particle Diameter and Metallic Species of Gold Fine Particles As a result of observation with the scanning electron microscope (SEM-EDX), the primary particle diameter of the produced gold fine particles was 5 nm to 100 nm and the average primary particle diameter was 25 nm. Further, when the gold fine particles were analyzed with an energy dispersive X-ray analyzer (EDX), the metal composition was 100 mass % of gold.

(B) Identification of Coating Material of Metal Fine Particles

The obtained gold fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from polyvinylpyrrolidon and polyvinyl alcohol as the organic compounds (C2).

(C) Content of Coating Material

From the analysis of the gold fine particles using the carbon/sulfur analyzer, the ratio of the polyvinylpyrrolidone and polyvinyl alcohol as the organic compounds (C2) in the coated gold fine particles (P1), i.e., ([organic compounds (C2)/gold fine particles (P1)]×100 (mass %)) was 1 mass %.

(3) Preparation of Metal Fine Particle-Containing Composition

After adding 0.2 g of polyglycerin as an activating agent to 1.8 g of ethylene glycol, the mixture was thoroughly stirred using an ultrasonic homogenizer to prepare a mixed solvent. Next, 1.6 g of the obtained gold fine particles and 6.4 g of tin powder having an average particle diameter of 50 μm were added to the mixed solvent under a nitrogen atmosphere, and the mixture was kneaded with a mortar and a pestle to prepare the metal fine particle-containing composition.

Example 11

Metal fine particle-containing composition was prepared to contain silver fine particles produced by polyol reduction as metal fine particles, tin powder (100% Sn) as low melting point metal powder, polyglycerine as an activating agent, and ethylene glycol as an organic solvent. Coating process was also performed to produce a silver sulfide on the surface of the silver fine particles.

(1) Preparation of Silber Fine Particles

A reduction reaction solution was prepared by adding 5 g of silver nitrate as a source of silver as a metal element, 50 g of polyvinylpyrrolidone as an organic dispersing agent, and 2 g of polyvinyl alcohol to 500 g of ethylene glycol. As the prepared reduction reaction solution was kept reacting at a bath temperature of 130° C. for 60 minutes while stirring, silver fine particles precipitated in the solution. The silver fine particle dispersion liquid thus obtained was diluted with ethanol and placed in a centrifugal separator to precipitate and collect silver fine particle components. Ethanol was added to the collected silver fine particles, followed by stirring and washing, and then twice of ethanol washing operation for collecting the silver fine particles by the centrifugal separator, and then washing with water, and drying and removing of the solvent to obtain 2 g of the silver fine particles.

(2) Coating with Inorganic Compound (C1)

Silver fine particles were placed in an atmosphere controlled heat treatment furnace and kept at 40° C. for 60 minutes in a mixed gas atmosphere of hydrogen sulfide (1 ppm). Thereafter, the silver fine particles were collected on an aluminum mesh on which a carbon supporting film was attached, and the solvent was removed by washing with water and washing with alcohol, and dried to coat the silver fine particles with the silver sulfide as the inorganic compound (C1).

(3) Evaluation of Produced Silver Fine Particles (A) Identification of Primary Particle Diameter and Metallic Species of Silver Fine Particles As a result of observation with the scanning electron microscope (SEM-EDX), the primary particle diameter of the produced silver fine particles was 5 nm to 120 nm and the average primary particle diameter was 35 nm. Further, when the silver fine particles were analyzed with an energy dispersive X-ray analyzer (EDX), the metal composition was 100 mass % of silver.

(B) Identification of Coating Material of Metal Fine Particles

As a result of observation of the obtained silver fine particles using a transmission electron microscope (TEM) and an attached energy dispersive X-ray spectrometer (TEM-EDX), silver was found in the core portion and silver sulfide ($Ag_2S$) was found in the shell portion of the primary particles of the silver fine particles. Further, the silver fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from polyvinylpyrrolidon and polyvinyl alcohol. As a result of the identification, it was checked that the copper fine particles were coated with the coating material produced by coexisting silver sulfide as the inorganic compound (C1) and polyvinylpyrrolidone as the organic compound (C2).

(C) Content of Coating Material

From the analysis of the main peak intensity ratio by X-ray diffraction, the ratio of the silver sulfide as the inorganic compound (C1) in the coated silver fine particles (P1), i.e., ([inorganic compound (C1)/silver fine particles (P1)]×100 (mass %)) was 0.3 mass %. From the analysis of the silver fine particles using the carbon/sulfur analyzer, the ratio of the polyvinylpyrrolidone and polyvinyl alcohol as the organic compounds (C2) in the coated silver fine particles (P1), i.e., ([organic compounds (C2)/silver fine particles (P1)]×100 (mass %)) was 1.2 mass %.

(4) Preparation of Metal Fine Particle-Containing Composition

After adding 0.2 g of polyglycerin as an activating agent to 1.8 g of ethylene glycol, the mixture was thoroughly stirred using an ultrasonic homogenizer to prepare a mixed solvent. Next, 1.2 g of the coated silver fine particles, 0.4 g of silver powder having an average particle diameter of 5 and 6.4 g of tin powder having an average particle diameter of 50 μm were added to the mixed solvent under a nitrogen atmosphere, and the mixture was kneaded with a mortar and a pestle to prepare the metal fine particle-containing composition.

Example 12

Metal fine particle-containing composition was prepared to contain copper fine particles produced by electroless reduction as metal fine particles, tin powder (100% Sn) as low melting point metal powder, and nonanoic acid and abietic acid as activating agents.

(1) Preparation of Copper Fine Particles

Ten liters (L) of reduction reaction aqueous solution was prepared by employing 200 g of monohydrate (($CH_3COO$)$_2Cu.1H_2O$) of copper (II) acetate as a source of copper as a metal element, 10 g of polyvinylpyrrolidone as organic additives, and 13.6 g of trihydrate ($CH_3COONa.3H_2O$) of sodium acetate as a source of alkali metal ion. The pH of the reduction reaction aqueous solution was about 5.5.

Next, in this solution, current was passed between the rod cathode (cathode electrode) made of SUS 304 and the platinum plate anode (anode electrode) at a bath temperature of 25° C. and a current density of 15 A/dm$^2$ for 15 minutes to precipitate copper fine particles in the vicinity of the outer surface of the cathode electrode. The reaction aqueous solution after the reduction reaction was completed was collected on an aluminum mesh on which a carbon supporting film was attached, washed with ethanol and washed with water to remove the solvent by drying, and then 5 g of copper fine particles were obtained.

(2) Evaluation of Produced Copper Fine Particles (A) Identification of Primary Particle Diameter and Metallic Species of Copper Fine Particles As a result of observation with the scanning electron microscope (SEM-EDX), the primary particle diameter of the produced copper fine particles was 20 nm to 300 nm and the average primary particle diameter was 50 nm. Further, when the copper fine particles were analyzed with an energy dispersive X-ray analyzer (EDX), the metal composition was 100 mass % of copper.

(B) Identification of Coating Material of Metal Fine Particles

The obtained copper fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from polyvinylpyrrolidon as the organic compound (C2).

(C) Content of Coating Material

From the analysis of the copper fine particles using the carbon/sulfur analyzer, the ratio of the polyvinylpyrrolidone as the organic compound (C2) in the coated copper fine particles (P1) ([organic compound (C2)/copper fine particles (P1)]×100 (mass %)) was 0.1 mass %.

(3) Preparation of Metal Fine Particle-Containing Composition

A mixed solvent was prepared such that 1.5 g of nonanoic acid as an activating agent and 1 g of abietic acid were added, and then mixed thoroughly with an ultrasonic homogenizer. Next, 1.5 g of the obtained copper fine particles, 0.5 g of copper powder having an average particle diameter of 5 μm and 8 g of tin powder having an average particle diameter of 5 μm were added to the mixed solvent under a nitrogen atmosphere, and the mixture was kneaded with a mortar and a pestle to prepare the metal fine particle-containing composition.

Example 13

Metal fine particle-containing composition was prepared to contain copper fine particles produced by electroless reduction as metal fine particles, tin powder (100% Sn) as low melting point metal powder, and oleic acid and abietic acid as activating agents.
(1) Preparation of Copper Fine Particles Copper fine particles were obtained in the same manner as in Example 12.
(2) Evaluation of Produced Copper Fine Particles The same result as in Example 12 was obtained.
(3) Preparation of Metal Fine Particle-Containing Composition A mixed solvent was prepared such that 1.5 g of oleic acid and 1 g of abietic acid as activating agents were added, and then mixed thoroughly with an ultrasonic homogenizer. Next, 1.5 g of the obtained copper fine particles, 0.5 g of copper powder having an average particle diameter of 1 μm, and 8 g of tin powder having an average particle diameter of 5 μm were added to the mixed solvent under a nitrogen atmosphere, and the mixture was kneaded with a mortar and a pestle to prepare the metal fine particle-containing composition.

Example 14

Metal fine particle-containing composition was prepared to contain copper fine particles produced by electroless reduction as metal fine particles, tin powder (100% Sn) as low melting point metal powder, and oleic acid and abietic acid as activating agents. Also, the surface of the tin powder was coated with polyvinylpyrrolidone.
(1) Preparation of Copper Fine Particles Copper fine particles were obtained in the same manner as in Example 12.
(2) Evaluation of Produced Copper Fine Particles The same result as in Example 12 was obtained.
(3) Coating Treatment of Low Melting Point Metal Powder with Organic Compound (C2)

The tin powder was added to a methanol solution of polyvinylpyrrolidone (10 mass %), and the stirring state was maintained for 10 minutes at a bath temperature of 20° C. Thereafter, the tin powder was collected and methanol was dried and removed in a reduced pressure atmosphere to coat the low melting point metal powder with polyvinylpyrrolidone as the organic compound (C2). From the analysis of the tin powder using the carbon/sulfur analyzer, the ratio of polyvinylpyrrolidone as the organic compound (C2) in the coated low melting point metal powder (P2) ([organic compound (C2)/low melting point metal powder (P2)]×100 (mass %)) was 0.1 mass %.

(4) Preparation of Metal Fine Particle-Containing Composition

A mixed solvent was prepared such that 1.5 g of oleic acid and 1 g of abietic acid as activating agents were added, and then mixed thoroughly with an ultrasonic homogenizer. Next, 1.8 g of the obtained copper fine particles, 0.2 g of copper powder having an average particle diameter of 50 μm, and 8 g of tin powder that was coated with polyvinylpyrrolidone and had an average particle diameter of 5 μm were added to the mixed solvent under a nitrogen atmosphere, and the mixture was kneaded with a mortar and a pestle to prepare the metal fine particle-containing composition.

Example 15

Metal fine particle-containing composition was prepared to contain copper fine particles produced by electroless reduction as metal fine particles, tin powder (100% Sn) as low melting point metal powder, and oleic acid and abietic acid as activating agents. Also, the surfaces of the copper fine particles and the tin powder were coated with 4-(diphenylphosphino) styrene.
(1) Preparation of Copper Fine Particles Copper fine particles were obtained in the same manner as in Example 12.
(2) Coating Treatment of Metal Fine Particles with Organic Compound (C2)

The copper fine particles were added to a 4-(diphenylphosphino) styrene (10 mass %) toluene solution, and the stirring state was maintained for 10 minutes at a bath temperature of 20° C. Thereafter, the copper fine particles were collected by centrifugation, and the toluene was dried and removed in a reduced pressure atmosphere to coat the low melting point metal powder with 4-(diphenylphosphino) styrene as the organic compound (C2).
(3) Evaluation of Produced Copper Fine Particles
(A) Identification of Primary Particle Diameter and Metallic Species of Copper Fine Particles The same result as in Example 12 was obtained.
(B) Identification of Coating Material of Metal Fine Particles The obtained copper fine particles were coated on a nanostructure electrode and analyzed by a microscopic Raman spectroscope and a Fourier transform infrared spectrophotometer. As a result, a peak was detected derived from polyvinylpyrrolidone and 4-(diphenylphosphino) styrene as the organic compounds (C2).
(C) Content of Coating Material From the analysis of the copper fine particles using the carbon/sulfur analyzer, the ratio of the polyvinylpyrrolidone and 4-(diphenylphosphino) styrene as the organic compounds (C2) in the coated copper fine particles (P1), i.e., ([organic compounds (C2)/copper fine particles (P1)]×100 (mass %)) was 1.2 mass %.
(4) Coating Treatment of Low Melting Point Metal Powder with Organic Compound (C2)

The tin powder was added to a 4-(diphenylphosphino) styrene (10 mass %) toluene solution, and the stirring state was maintained for 10 minutes at a bath temperature of 20° C. Thereafter, the tin powder was collected, and the toluene was dried and removed in a reduced pressure atmosphere to coat the low melting point metal powder with 4-(diphenylphosphino) styrene as the organic compound (C2). From the analysis of the tin powder using the carbon/sulfur analyzer, the ratio of 4-(diphenylphosphino) styrene as the organic compound (C2) in the coated low melting point metal powder (P2) ([organic compound (C2)/low melting point metal powder (P2)]×100 (mass %)) was 0.3 mass %.

(5) Preparation of Metal Fine Particle-Containing Composition

A mixed solvent was prepared such that 1.5 g of oleic acid and 1 g of abietic acid as activating agents were added, and then mixed thoroughly with an ultrasonic homogenizer. Next, 2 g of the obtained copper fine particles and 8 g of tin powder that was coated with 4-(diphenylphosphino) styrene and had an average particle diameter of 5 μm were added to the mixed solvent under a nitrogen atmosphere, and the mixture was kneaded with a mortar and a pestle to prepare the metal fine particle-containing composition.

Example 16

Metal fine particle-containing composition was prepared to contain copper fine particles produced by electroless reduction as metal fine particles, tin powder (100% Sn) as low melting point metal powder, and oleic acid and abietic acid as activating agents. Also, the surfaces of the copper fine particles and the tin powder were coated with bis(4-methacryloylthiophenyl) sulfide.

(1) Preparation of Copper Fine Particles

Copper fine particles were obtained in the same manner as in Example 12.

(2) Coating Treatment of Metal Fine Particles with Organic Compound (C2)

The copper fine particles were added to a bis(4-methacryloylthiophenyl) sulfide (10 mass %) toluene solution, and the stirring state was maintained for 10 minutes at a bath temperature of 20° C. Thereafter, the copper fine particles were collected by centrifugation, and the toluene was dried and removed in a reduced pressure atmosphere to coat the low melting point metal powder with bis(4-methacryloylthiophenyl) sulfide as the organic compound (C2).

(3) Evaluation of Produced Copper Fine Particles (A) Identification of Primary Particle Diameter and Metallic Species of Copper Fine Particles The same result as in Example 12 was obtained.

(B) Identification of Coating Material of Metal Fine Particles

The obtained copper fine particles were coated on a nanostructure electrode and analyzed by a microscopic Raman spectroscope and a Fourier transform infrared spectrophotometer. As a result, a peak was detected derived from polyvinylpyrrolidone and bis(4-methacryloylthiophenyl) sulfide as the organic compounds (C2).

(C) Content of Coating Material

From the analysis of the copper fine particles using the carbon/sulfur analyzer, the ratio of the polyvinylpyrrolidone and bis(4-methacryloylthiophenyl) sulfide as the organic compounds (C2) in the coated copper fine particles (P1), i.e., ([organic compounds (C2)/copper fine particles (P1)]×100 (mass %)) was 0.8 mass %.

(4) Coating Treatment of Low Melting Point Metal Powder with Organic Compound (C2)

The tin powder was added to a bis(4-methacryloylthiophenyl) sulfide (10 mass %) toluene solution, and the stirring state was maintained for 10 minutes at a bath temperature of 20° C. Thereafter, the tin powder was collected, and the toluene was dried and removed in a reduced pressure atmosphere to coat the low melting point metal powder with bis(4-methacryloylthiophenyl) sulfide as the organic compound (C2). From the analysis of the tin powder using the carbon/sulfur analyzer, the ratio of bis(4-methacryloylthiophenyl) sulfide as the organic compound (C2) in the coated low melting point metal powder (P2) ([organic compound (C2)/low melting point metal powder (P2)]×100 (mass %)) was 0.2 mass %.

(5) Preparation of Metal Fine Particle-Containing Composition

A mixed solvent was prepared such that 1.5 g of oleic acid and 1 g of abietic acid as activating agents were added, and then mixed thoroughly with an ultrasonic homogenizer. Next, 2 g of the obtained copper fine particles and 8 g of tin powder that was coated with bis(4-methacryloylthiophenyl) sulfide and had an average particle diameter of 5 μm were added to the mixed solvent under a nitrogen atmosphere, and the mixture was kneaded with a mortar and a pestle to prepare the metal fine particle-containing composition.

Comparative Example 1

A metal fine particle-containing composition was prepared in the same manner as in Example 1 except that antimony powder (100% Sb) was employed in place of tin powder (100% Sn) as the metal powder.

(1) Preparation of Copper Fine Particles

Five grams of copper fine particles were obtained in the same manner as in Example 1.

(2) Evaluation of Produced Copper Fine Particles

The same evaluation result as in Example 1 was obtained.

(3) Preparation of Metal Fine Particle-Containing Composition

After adding 0.6 g of abietic acid as an activating agent to 1.2 g of glycerin and 0.2 g of diethylene glycol monoethyl ether, the mixture was thoroughly stirred using an ultrasonic homogenizer to prepare a mixed solvent. Next, 1.6 g of the obtained copper fine particles and 6.4 g of antimony powder having an average particle diameter of 5 μm were added to the mixed solvent under a nitrogen atmosphere, and the mixture was kneaded with a mortar and a pestle to prepare the metal fine particle-containing composition.

Comparative Example 2

A metal fine particle-containing composition was prepared in the same manner as in Example 3 except that oxalic acid was employed in place of monoglycerin caprylate as an activating agent.

(1) Preparation of Copper Fine Particles

Five grams of copper fine particles were obtained in the same manner as in Example 3.

(2) Additional Coating of Oxide

Copper fine particles additionally coated with cuprous oxide were obtained in the same manner as in Example 3.

(3) Evaluation of Produced Copper Fine Particles

The same evaluation result as in Example 3 was obtained.

(4) Preparation of Metal Fine Particle-Containing Composition

After adding 0.2 g of oxalic acid as an activating agent to 1.8 g of glycerin, the mixture was thoroughly stirred using an ultrasonic homogenizer to prepare a mixed solvent. Next, 1.6 g of the obtained copper fine particles and 6.4 g of tin powder having an average particle diameter of 5 μm were added to the mixed solvent under a nitrogen atmosphere, and the mixture was kneaded with a mortar and a pestle to prepare the metal fine particle-containing composition.

Comparative Example 3

A metal fine particle-containing composition was prepared in the same manner as in Example 3 except that the activating agent was not added.

(1) Preparation of Copper Fine Particles

Five grams of copper fine particles were obtained in the same manner as in Example 3.
(2) Additional Coating of Oxide
Copper fine particles additionally coated with cuprous oxide were obtained in the same manner as in Example 3.
(3) Evaluation of Produced Copper Fine Particles
The same evaluation result as in Example 3 was obtained.
(4) Preparation of Metal Fine Particle-Containing Composition The metal fine particle-containing composition was prepared such that 1.6 g of the obtained copper fine particles and 6.4 g of tin powder having an average particle diameter of 5 μm in addition to 2 g of glycerin were added to the mixed solvent under a nitrogen atmosphere, and the mixture was kneaded with a mortar and a pestle. The metal fine particle-containing composition was prepared in the same manner as in Example 7 except that the primary particle diameter of the copper fine particles exceeded 500 nm.
(1) Preparation of Copper Fine Particles
Five grams of copper fine particles were obtained in the same manner as in Example 7 except that the oxidation-reduction potential was regulated to be less than or equal to −50 mV and greater than −150 mV.
(2) Evaluation of Produced Copper Fine Particles
(A) Identification of Primary Particle Diameter and Metallic Species of Copper Fine Particles As a result of observation with the scanning electron microscope (SEM-EDX), the primary particle diameter of the produced copper fine particles was 550 nm to 900 nm and the average primary particle diameter was 750 nm. Further, when the copper fine particles were analyzed with an energy dispersive X-ray analyzer (EDX), the metal composition was 100 mass % of copper.

Comparative Example 4

A metal fine particle-containing composition was prepared in the same manner as in Example 7 except that the primary particle diameter of the copper fine particles exceeded 500 nm.
(1) Preparation of Copper Fine Particles
Five grams of copper fine particles were obtained in the same manner as in Example 7 except that the oxidation-reduction potential was regulated to be less than or equal to −150 mV and greater than −300 mV.
(2) Evaluation of Produced Copper Fine Particles
(A) Identification of Primary Particle Diameter and Metallic Species of Copper Fine Particles As a result of observation with the scanning electron microscope (SEM-EDX), the primary particle diameter of the produced copper fine particles was 550 nm to 900 nm and the average primary particle diameter was 750 nm. Further, when the copper fine particles were analyzed with an energy dispersive X-ray analyzer (EDX), the metal composition was 100 mass % of copper.
(B) Identification of Coating Material of Metal Fine Particles The obtained copper fine particles were coated on a nanostructure electrode and analyzed by a microscopic Raman spectroscope and a Fourier transform infrared spectrophotometer. As a result, a peak was detected attributable to pyrrolidone group ($C_4H_6NO$) derived from polyvinylpyrrolidon and polyacrylamide.
(C) Content of Coating Material From the analysis of the copper fine particles using the carbon/sulfur analyzer, the ratio of the organic compounds (C2) in the copper fine particles (P1) coated with polyvinylpyrrolidone and polyacrylamide as the organic compounds (C2) ([organic compounds (C2)/copper fine particles (P1)]×100 (mass %)) was 9.5 mass %.
(3) Preparation of Metal Fine Particle-Containing Composition After adding 0.6 g of polyglyceric acid as an activating agent to 1.4 g of glycerin, the mixture was thoroughly stirred using an ultrasonic homogenizer to prepare a mixed solvent. Next, 1.6 g of the obtained copper fine particles and 6.4 g of zinc powder having an average particle diameter of 5 μm were added to the mixed solvent under a nitrogen atmosphere, and the mixture was kneaded with a mortar and a pestle to prepare the metal fine particle-containing composition.

Example 17

(1) Joining Evaluation Test of Plate Material

Using the metal fine particle-containing composition obtained in Examples 1 to 16 above, the obtained particle-containing composition was applied to a metal substrate (size: 2 cm×10 cm) such that the joined area after heating was 2 cm×2 cm and the thickness of the joined member after heating was 20 μm to 300 μm. Thereafter, a sample on which the metal substrate (size: 2 cm×10 cm) was placed on the coating film was placed in a an atmosphere controlled heat treatment furnace, and heated and fired in a nitrogen gas atmosphere or air atmosphere at a temperature range of 250° C. to 500° C. for 10 to 60 minutes, and then slowly cooled in the heat treatment furnace to room temperature to join the metal plate material and the copper substrate through the sintered body.

The joined body sample obtained by such a process was evaluated for the tensile strength of the joined portion by a method based on JIS Z 2241 (metal material tensile test method). Further, as shown in FIG. 1, a cross section SEM image of the joined portion is photographed, the pixels in the gap portion of the photographed image were set black, and the other pixels were set white to provide two-tone image, and then the porosity was converted into numerical data using image digitization software. The results of the evaluations are shown in Tables 1 and 2.
(2) Chip Joining Evaluation The metal fine particle-containing composition obtained in Examples 1 to 16 was applied by dry coating to a copper substrate (size: 2 cm×2 cm) such that the thickness of the joined member after sintering was 20 μm to 300 μm. Thereafter, a sample where a semiconductor silicon chip (size: 4 mm×4 mm) was pushed onto a coating film at a pressure of 4 MPa was placed in an atmosphere controlled heat treatment furnace, and heated and fired in a nitrogen gas atmosphere or air atmosphere at a temperature range of 200° C. to 450° C. for 20 to 60 minutes, and then slowly cooled in the heat treatment furnace to room temperature to join the semiconductor device and the conductive substrate through the sintered body. The die shear strength of the silicon chip joined to the substrate surface was evaluated at 25° C. using a die shear strength evaluating apparatus based on US MIL-STD-883. The obtained evaluation results are shown in Tables 1 to 3.

Comparative Example 5

Figure 2:
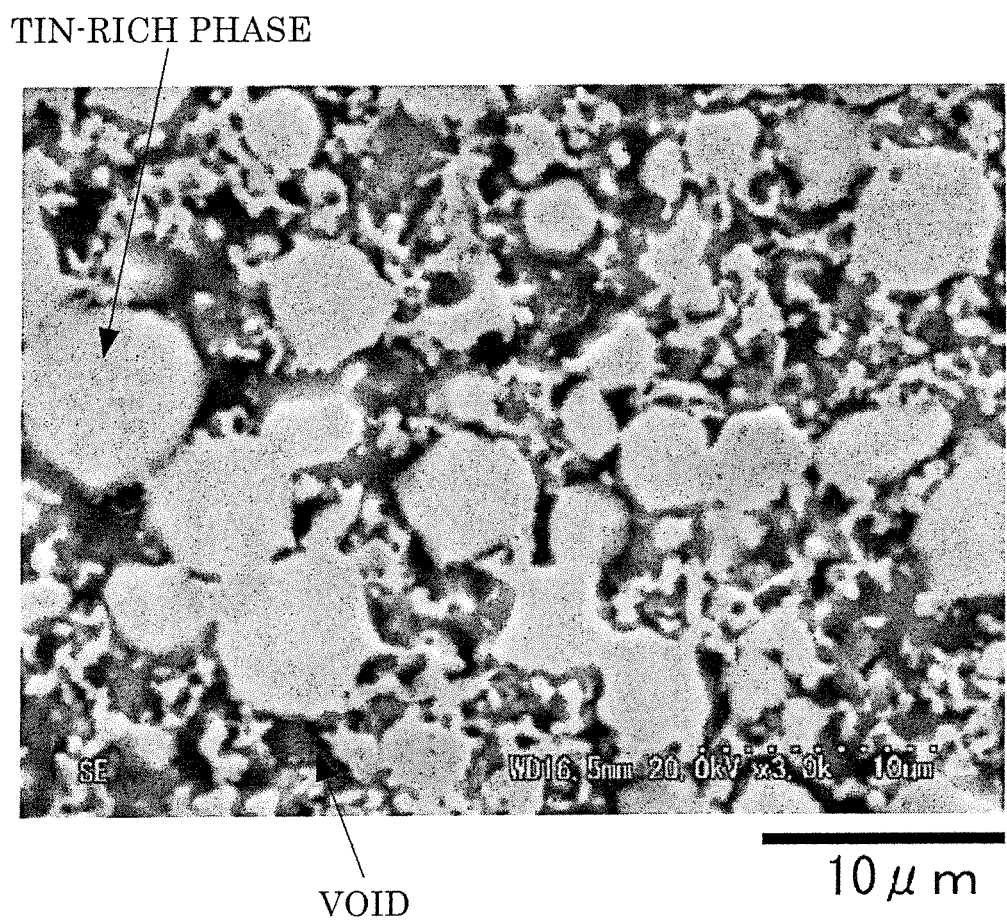
FIG. 2 is a photograph of a cross section of a joined portion of a joined copper base material in Comparative Example 5 using a sample prepared in Comparative Example 3 taken by the scanning electron microscope (SEM).

Experimental samples were prepared in the same manner as in Example 17 except that the metal fine particle-containing composition of Example 17 was replaced with the metal fine particle-containing composition obtained in Comparative Examples 1 to 4. FIG. 2 is a sectional SEM image of the joined portion of the obtained composition. The evaluation results are shown in Table 4.

Discussion on Evaluation Results

In the joining evaluation of the plate material, the joining strength in the examples using the particle-containing composition satisfying the constitution of this disclosure was clearly better than those in the comparative examples. The porosity of the joined portion also tended to be lower in the examples than those in the comparative examples. Further, in the chip joining evaluation, the die shear strength was higher in the examples than those in the comparative examples. As described above, it was checked that the use of the metal fine particle-containing composition having the constitution of the present disclosure allows the joining strength of the materials to be greatly improved.

TABLE 1

| | | example number | | | | | |
|---|---|---|---|---|---|---|---|
| | | example 17-1 | example 17-2 | example 17-3 | example 17-4 | example 17-5 | example 17-6 |
| (example number where samples were prepared) | | (example 1) | (example 2) | (example 3) | (example 4) | (example 5) | (example 6) |
| [1] metal fine particle dispersion liquid | | | | | | | |
| (1) components and composition of metal fine particles (P1) | | | | | | | |
| (i) metal element (M) | — | copper | copper | copper | copper | copper | copper |
| (ii) particle diameter | (nm) | 20~200 | 20~200 | 20~200 | 20~200 | 20~200 | 1~50 |
| (iii) coating material (C) | | | | | | | |
| (iii-1) inorganic compound (C1) | — | — | copper hydroxide | cuprous oxide | copper sulphate | cupric chloride | copper carbonate |
| content of inorganic compound (C1) in metal fine particles (P1) | (mass %) | — | 10.5 | 70 | 0.1 | 0.9 | 4 |
| (iii-2) organic compound (C2) | — | polyvinyl-pyrrolidone | polyvinyl-pyrrolidone | polyvinyl-pyrrolidone | polyvinyl-pyrrolidone | polyvinyl-pyrrolidone | polyvinyl-pyrrolidone |
| content of organic compound (C2) in metal fine particles (P1) | (mass %) | 0.1 | 0.1 | 0.1 | 0.1 | 0.1 | 10 |
| (2) components and composition of low melting point metal powder (P2) | | | | | | | |
| (i) low melting metal species | — | 100% Sn | 100% Sn | 100% Sn | 96.5% Sn—3% Ag—0.5% Cu | 91.99% Sn—8% Zn—0.01% Al | 42% Sn—58% Bi |
| (ii) melting point | (° C.) | 232 | 232 | 232 | 217 | 199 | 138 |
| (iii) particle diameter | (μm) | 5 | 5 | 5 | 10 | 10 | 0.5 |
| (iv) organic compound (C2) | — | — | — | — | — | — | — |
| content of organic compound (C2) in low melting point metal powder (P2) | (mass %) | — | — | — | — | — | — |
| (3) component of activating agent (A) | | | | | | | |
| nonanoic acid | | — | — | — | — | — | — |
| oleic acid | | — | — | — | — | — | — |
| abietic acid | | — | ○ | ○ | — | — | — |
| adipic acid | | — | — | — | ○ | — | — |
| fumaric acid | | — | — | — | — | ○ | — |
| oxalic acid | | — | — | — | — | — | ○ |
| mono glycerin caprylate | | — | — | — | ○ | — | — |
| polyglycerol | | — | — | — | — | — | — |
| (4) organic solvent (S) | | | | | | | |
| (i) organic solvent (S1) | — | glycerin | glycerin | glycerin | glycerin | glycerin | ethylene glycol |
| (ii) organic solvent (S2) | — | diethylene glycol mono ethyl ether | diethylene glycol mono-butyl ether | — | diethylene glycol mono-butyl ether | diethylene glycol mono-butyl ether | 1-propanol |
| [2] evaluation results of sheet joining | | | | | | | |
| (i) firing conditions — heating temperature | (° C.) | 300 | 300 | 300 | 300 | 300 | 250 |
| rate of temperature increase | (° C./min) | 50 | 50 | 50 | 50 | 50 | 50 |
| heating atmosphere | — | nitrogen | nitrogen | nitrogen | nitrogen | nitrogen | nitrogen |
| (ii) metal plate species | — | copper | copper | copper | copper | copper | copper |
| (iii) tensile strength of joined body | (N/mm2) | 28 | 52 | 55 | 45 | 48 | 65 |
| (iv) porosity of brazed portion | (volume %) | 12.8 | 5.5 | 5.7 | 9.4 | 9.2 | 5 |
| [3] evaluation results of chip joining | | | | | | | |
| (i) firing conditions — heating temperature | (° C.) | 250 | 250 | 250 | 250 | 230 | 200 |
| rate of temperature increase | (° C./min) | 10 | 10 | 10 | 10 | 10 | 10 |
| heating atmosphere | — | nitrogen | nitrogen | nitrogen | nitrogen | nitrogen | nitrogen |
| (ii) die shear strength | (N/mm2) | 25 | 48 | 50 | 40 | 41 | 55 |

TABLE 2

| | | example 17-7 | example 17-8 | example 17-9 | example 17-10 | example 17-11 |
|---|---|---|---|---|---|---|
| (example number where samples were prepared) | | (example 7) | (example 8) | (example 9) | (example 10) | (example 11) |
| [1] metal fine particle dispersion liquid | | | | | | |
| (1) components and composition of metal fine particles (P1) | | | | | | |
| (i) metal element (M) | | — | copper | copper | copper, nickel | gold | silver |
| (ii) particle diameter | (nm) | | 40~500 | 1~100 | 30~150 | 5~100 | 5~120 |
| (iii) coating material (C) | | | | | | | |
| (iii-1) inorganic compound (C1) | | — | — | — | cuprous oxide nickel oxide | — | silver sulfide |
| content of inorganic compound (C1) in metal fine particles (P1) | (mass %) | — | — | — | 50 | — | 0.3 |
| (iii-2) organic compound (C2) | | — | polyvinyl-pyrrolidone polyacryl-amide | N-vinyl-2-pyrrolidene N-methyl-2-pyrrolidone | N-vinyl-2-pyrrolidone | polyvinyl-pyrrolidone polyvinyl alcohol | polyvinyl-pyrrolidone polyvinyl alcohol |
| contect of organic compound (C2) in metal fine particles (P1) | (mass %) | | 30 | 2 | 1 | 1 | 1.2 |
| (2) components and composition of low melting point metal powder (P2) | | | | | | | |
| (i) low melting metal species | | — | 100% Zn | 89% Sn—8% Zn—3% Bi | 89% Sn—8% Zn—3% Bi | 100% Sn | 100% Sn |
| (ii) melting point | (° C.) | | 420 | 197 | 197 | 232 | 232 |
| (iii) particle diameter | (μm) | | 5 | 5 | 5 | 50 | 50 |
| (iv) organic compound (C2) | | — | — | — | — | — | — |
| content of organic compound (C2) in low melting point metal powder (P2) | (mass %) | — | — | — | — | — | — |
| (3) component of activating agent (A) | | | | | | | |
| nonanoic acid | | — | — | — | — | — | — |
| oleic acid | | — | — | — | — | — | — |
| abietic acid | | — | — | — | — | — | — |
| adipic acid | | — | — | — | — | — | — |
| fumaric acid | | — | — | — | — | — | — |
| oxalic acid | | — | — | — | — | — | — |
| mono glycerin caprylate | | — | — | ○ | ○ | — | — |
| polyglycerol | | — | ○ | — | — | ○ | ○ |
| (4) organic solvent (S) | | | | | | | |
| (i) organic solvent (S1) | | — | glycerin | glycerin | glycerin | ethylene glycol | ethylene glycol |
| (ii) organic solvent (S2) | | — | — | — | — | — | — |
| [2] evaluation results of sheet joining | | | | | | | |
| (i) firing conditions | heating temperature | (° C.) | 500 | 300 | 300 | 400 | 400 |
| | rate of temperature increase | (° C./min) | 50 | 50 | 50 | 50 | 50 |
| | heating atmosphere | — | nitrogen | nitrogen | nitrogen | atmosphere | nitrogen |
| (ii) metal plate species | | — | copper | copper | copper | copper | copper |
| (iii) tensile strength of joined body | | (N/mm2) | 21 | 60 | 62 | 35 | 37 |
| (iv) porosity of brazed portion | | (volume %) | 18 | 6 | 3.5 | 9.4 | 7.6 |
| [3] evaluation results of chip joining | | | | | | | |
| (i) firing conditions | heating temperature | (° C.) | 450 | 230 | 230 | 250 | 250 |
| | rate of temperature increase | (° C./min) | 10 | 10 | 10 | 10 | 10 |
| | heating atmosphere | — | nitrogen | nitrogen | nitrogen | nitrogen | nitrogen |
| (ii) die shear strength | | (N/mm2) | 20 | 51 | 53 | 30 | 35 |

TABLE 3

| | | example 17-12 | example 17-13 | example 17-14 | example 17-15 | example 17-16 |
|---|---|---|---|---|---|---|
| (example number where samples were prepared) | | (example 12) | (example 13) | (example 14) | (example 15) | (example 16) |
| [1] metal fine particle dispersion liquid | | | | | | |
| (1) components and composition of metal fine particles (P1) | | | | | | |
| (i) metal element (M) | — | copper | copper | copper | copper | copper |
| (ii) particle diameter | (nm) | 20~300 | 20~300 | 20~300 | 20~300 | 20~300 |
| (iii) coating material (C) | | | | | | |
| (iii-1) inorganic compound (C1) | — | — | — | — | — | — |
| content of inorganic compound (C1) in metal fine particles (P1) | (mass %) | — | — | — | — | — |

TABLE 3-continued

| | | example 17-12 | example 17-13 | example 17-14 | example 17-15 | example 17-16 |
|---|---|---|---|---|---|---|
| (iii-2) organic compound (C2) | — | — | polyvinyl-pyrrolidone | polyvinyl-pyrrolidone | polyvinyl-pyrrolidone | polyvinyl-pyrrolidone 4-(diphenyl-phosphino) styrene | polyvinyl-pyrrolidone bis(4-methacryl-oylthiophenyl) sulfide |
| content of organic compound (C2) in metal fine particles (P1) | (mass %) | 0.1 | 0.1 | 0.1 | 1.2 | 0.8 |
| (2) components and composition of low melting point metal powder (P2) | | | | | | |
| (i) low melting metal species | — | 100% Sn | 100% Sn | 100% Sn | 100% Sn | 100% Sn |
| (ii) melting point | (° C.) | 232 | 232 | 232 | 232 | 232 |
| (iii) particle diameter | (μm) | 5 | 5 | 5 | 5 | 5 |
| (iv) organic compound (C2) | — | — | — | polyvinyl pyrrolidone | -(diphenyl-phosphino) styrene | 4-(diphenyl-oylthiophenyl) sulfide |
| content of organic compound (C2) in low melting point metal powder (P2) | (mass %) | — | — | 0.1 | 0.3 | 0.2 |
| (3) component of activating agent (A) | | | | | | |
| nonanoic acid | — | — | ○ | — | — | — |
| oleic acid | — | — | — | ○ | ○ | ○ | ○ |
| abietic acid | — | — | ○ | ○ | ○ | ○ | ○ |
| adipic acid | — | — | — | — | — | — |
| fumaric acid | — | — | — | — | — | — |
| oxalic acid | — | — | — | — | — | — |
| mono glycerin caprylate | — | — | — | — | — | — |
| polyglycerol | — | — | — | — | — | — |
| (4) organic solvent (S) | | | | | | |
| (i) organic solvent (S1) | — | — | — | — | — | — |
| (ii) organic solvent (S2) | — | — | — | — | — | — |
| [2] evaluation results of sheet joining | | | | | | |
| (i) firing conditions  heating temperature | (° C.) | 350 | 350 | 350 | 400 | 400 |
| rate of temperature increase | (° C./min) | 50 | 50 | 50 | 50 | 50 |
| heating atmosphere | — | nitrogen | nitrogen | nitrogen | nitrogen | nitrogen |
| (ii) metal plate species | | copper | copper | copper | copper | copper |
| (iii) tensile strength of joined body | (N/mm2) | 25 | 38 | 45 | 65 | 65 |
| (iv) porosity of brazed portion | (volume %) | 15 | 14 | 10.2 | 5.6 | 5.8 |
| [3] evaluation results of chip | | | | | | |
| (i) firing conditions  heating temperature | (° C.) | 300 | 300 | 300 | 350 | 350 |
| rate of temperature increase | (° C./min) | 10 | 10 | 10 | 10 | 10 |
| heating atmosphere | — | nitrogen | nitrogen | nitrogen | nitrogen | nitrogen |
| (ii) die shear strength | (N/mm2) | 20 | 30 | 35 | 52 | 50 |

TABLE 4

| | | comparative example 5-1 (comparative example 1) | comparative example 5-2 (comparative example 2) | comparative example 5-3 (comparative example 3) | comparative example 5-4 (comparative example 4) |
|---|---|---|---|---|---|
| [1] metal fine particle dispersion liquid | | | | | |
| (1) components and composition of metal fine particles (P1) | | | | | |
| (i) metal element (M) | — | copper | steel | copper | copper |
| (ii) particle diameter | (nm) | 20~200 | 20~200 | 20~200 | 550~900 |

TABLE 4-continued

|  |  | comparative example 5-1 (comparative example 1) | comparative example 5-2 (comparative example 2) | comparative example 5-3 (comparative example 3) | comparative example 5-4 (comparative example 4) |
|---|---|---|---|---|---|
| (iii) coating material (C) | | | | | |
| (iii-1) inorganic compound (C1) | — | — | — | copper (1) oxide | oxide steel (1) | — |
| content of inorganic compound (C1) in metal fine particles (P1) | (mass %) | — | 70 | 70 | — |
| (iii-2) organic compound (C2) | — | polyvinylpyrrolidone | polyvinylpyrrolidone | polyvinylpyrrolidone | polyvinylpyrrolidone polyacrylamide |
| content of organic compound (2) components and | (mass %) | 0.1 | 0.1 | 0.1 | 9.5 |
| (i) low melting metal species | — | 100% Sb | 100% Sn | 100% Sn | 100% Zn |
| (ii) melting point | (° C.) | 631 | 232 | 232 | 420 |
| (iii) particle diameter | (μm) | 5 | 5 | 5 | |
| (iv) organic compound (C2) | — | — | — | — | — |
| content of organic compound (3) component of activating | (mass %) | — | — | — | — |
| nonanoic acid | | — | — | — | — |
| oleic acid | | — | — | — | — |
| abietic acid | | — | ○ | — | — |
| adipic acid | | — | — | — | — |
| fumaric acid | | — | — | — | — |
| oxalic acid | | — | — | ○ | — |
| mono glycerin caprylate | | — | — | — | — |
| polyglycerol | | — | — | — | ○ |
| (4) organic solvent (S) | | | | | |
| (i) organic solvent (S1) | — | glycerin | glycerin | glycerin | glycerin |
| (ii) organic solvent (S2) | — | diethylene glycol mono ethyl ether | — | — | — |
| [2] evaluation results of sheet | | | | | |
| (i) firing conditions | heating temperature | (° C.) | 300 | 300 | 300 | 500 |
| | rate of temperature increase | (° C./min) | 50 | 50 | 50 | 50 |
| | heating atmosphere | — | nitrogen | nitrogen | nitrogen | nitrogen |
| (ii) metal plate species | — | copper | copper | copper | copper |
| (iii) tensile strength of joined body | (N/mm2) | 0.5 | 2.1 | 1 | 1.3 |
| (iv) porosity of the brazed portion | (volume %) | 32 | 22 | 25 | 40 |
| [3] evaluation results of chip joining | | | | | |
| (i) firing conditions | heating temperature | (° C.) | 250 | 250 | 250 | 450 |
| | rate of temperature increase | (° C./min) | 10 | 10 | 10 | 10 |
| | heating atmosphere | — | nitrogen | nitrogen | nitrogen | nitrogen |
| (ii) die shear strength | (N/mm2) | 0.5 | 9 | 5 | 8 |

What is claimed is:

1. A metal fine particle-containing composition comprising, metal fine particles (P1) composed of a metal element (M) having a bulk melting point of greater than 420° C. with a primary particle diameter of primary particles of the metal fine particles (P1) being 1 nm to 500 nm, a part of or an entire surface of the metal fine particles (P1) being coated with a coating material (C); a low melting point metal powder (P2) composed of a metal or an alloy having a bulk melting point of 420° C. or less; and an activating agent (A) that decomposes and removes the coating material (C) from the part of or the entire surface of the metal fine particles (P1) after the low melting point metal powder (P2) is melted, wherein the coating material (C) comprises an organic compound (C2), a content of the metal fine particles (P1) containing the coating material (C) is 0.5 mass % to 50 mass %, a ratio ([the organic compound (C2)/the metal fine particles (P1)]×100 (mass %)) of the organic compound (C2) in the metal fine particles (P1) is 0.1 mass % to 30 mass %, and the organic compound (C2) has a boiling point or decomposition point greater than or equal to the bulk melting point of the low melting point metal powder (P2).

2. The metal fine particle-containing composition according to claim 1, wherein the metal element (M) is one, two or more selected from the group consisting of copper, silver, gold, and nickel.

3. The metal fine particle-containing composition according to claim 1, wherein a particle diameter of primary particles of the low melting point metal powder (P2) is 0.5 µm to 50 µm.

4. The metal fine particle-containing composition according to claim 1, wherein the low melting point metal powder (P2) is a tin or a tin alloy in which one, two, or more selected from the group consisting of copper, silver, zinc, phosphorus, aluminum, and bismuth are solid-solved with tin.

5. The metal fine particle-containing composition according to claim 1, wherein the coating material (C) further comprises an inorganic compound (C1).

6. The metal fine particle-containing composition according to claim 5, wherein the inorganic compound (C1) is one, two, or more selected from the group consisting of oxides, hydroxides, chlorides, carbonates, sulfates and sulfides of the metal element (M).

7. The metal fine particle-containing composition according to claim 5, wherein a ratio ([the inorganic compound (C1)/the metal fine particles (P1)]×100 (mass %)) of the inorganic compound (C1) in the metal fine particles (P1) is 0.1 mass % to 50 mass %.

8. The metal fine particle-containing composition according to claim 1, wherein the organic compound (C2) is one, two, or more selected from the group consisting of an organic phosphorus compound, an organic sulfur compound, polyvinylpyrrolidone, polyacrylamide, polyvinyl alcohol, 2-pyrrolidone, and alkyl-2-pyrrolidone.

9. The metal fine particle-containing composition according to claim 1, wherein the activating agent (A) has one, two, or more carboxyl groups or ester groups.

10. The metal fine particle-containing composition according to claim 1, wherein the activating agent (A) has one, two, or more ether bonds.

11. The metal fine particle-containing composition according to claim 1, wherein a boiling point or decomposition point of the activating agent (A) is greater than or equal to a melting point of the low melting point metal powder (P2).

12. The metal fine particle-containing composition according to claim 1, wherein at least a part or an entire surface of the low melting point metal powder (P2) is covered with the organic compound (C2).

13. The metal fine particle-containing composition according to claim 1, further comprising an organic solvent (S) in which the activating agent (A) is soluble, wherein the organic solvent (S) includes alcohols (S1), and the alcohols (S1) include one, two, or more selected from the group consisting of methanol, ethanol, 1-propanol, 2-propanol, 1-butanol, 2-butanol, 2-methyl-1-propanol, 2-methyl-2-propanol, 2,2-dimethyl-1-propanol, 1-pentanol, 2-pentanol, 3-pentanol, 3-methyl-1-butanol, 2-methyl-1-butanol, 2,2-dimethyl-1-propanol, 3-methyl-2-butanol, 2-methyl-2-butanol, 1-hexanol, 2-hexanol, 3-hexanol, 2-methyl-2-hexanol, 2-methyl-3-hexanol, 1-heptanol, 2-heptanol, 4-heptanol, 2-ethyl-1-hexanol, 1-octanol, 2-octanol, ethylene glycol, diethylene glycol, 1,2-propanediol, 1,3-propanediol, 1,2-butanediol, 1,3-butanediol, 1,4-butanediol, 2-butene-1,4-diol, 2,3-butanediol, pentanediol, hexanediol, octanediol, glycerin, 1,1,1-trishydroxymethylethane, 2-ethyl-2-hydroxymethyl-1, 3-propanediol, 1,2,6-hexane triol, 1,2,3-hexanetriol, and 1,2,4-butanetriol.

14. The metal fine particle-containing composition according to claim 13, wherein the organic solvent (S) further contains a glycol monoalkyl ethers (S2) having an ether bond at least at an end of the bond being an alkyl group.

15. The metal fine particle-containing composition according to claim 14, wherein the organic solvent (S) has a boiling point at normal pressure of 100° C. or more and 500° C. or less.

16. The metal fine particle-containing composition according to claim 13, wherein the organic solvent (S) has a boiling point at normal pressure of 100° C. or more and 500° C. or less.

17. The metal fine particle-containing composition according to claim 1, further comprising a high melting point metal powder (P3) having a melting point of greater than 420° C. composed of the metal element (M) with a primary particle diameter of primary particles of the high melting point metal powder (P3) being greater than 500 nm and less than or equal to 50 µm.

* * * * *